(12) United States Patent
Shippy et al.

(10) Patent No.: US 7,269,744 B1
(45) Date of Patent: Sep. 11, 2007

(54) SYSTEM AND METHOD FOR SAFEGUARDING DATA BETWEEN A DEVICE DRIVER AND A DEVICE

(75) Inventors: Keith Shippy, Tempe, AZ (US); Jody Pfotenhauer, Tempe, AZ (US); Richard Mangold, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 09/675,976

(22) Filed: Sep. 29, 2000

(51) Int. Cl.
*H04L 9/32* (2006.01)

(52) U.S. Cl. .................................................. 713/193
(58) Field of Classification Search ................ 713/193; 380/201–204; 705/51–52
See application file for complete search history.

(56) References Cited

U.S. PATENT DOCUMENTS

| | | | |
|---|---|---|---|
| 5,572,442 A * | 11/1996 | Schulhof et al. ............ | 709/219 |
| 5,757,908 A * | 5/1998 | Cooper et al. .............. | 713/165 |
| 5,805,706 A | 9/1998 | Davis | |
| 6,654,888 B1 * | 11/2003 | Cooper et al. .............. | 713/190 |
| 6,668,324 B1 * | 12/2003 | Mangold et al. ............ | 713/189 |

OTHER PUBLICATIONS

Microsoft Computer Dictionary, 2002, Microsoft Press, fifth edition, pp. 64 and 145.*

* cited by examiner

*Primary Examiner*—Kambiz Zand
*Assistant Examiner*—Jacob Lipman
(74) *Attorney, Agent, or Firm*—Joni Stutman-Horn

(57) ABSTRACT

A data safeguarding system, method, and article for safeguarding an encrypted data-stream transmitting on a first channel from a first system to a second system. The data-stream can be intertwined with other data-streams. The data-stream is arranged in fixed length sequential blocks, each block including a header portion and a payload portion. The first system places a flag marking in the header portion indicating that the payload includes a tag having at least one identifier for selecting the decryption keys from the first system. The second system reads the flag, and if the flag indicates a tag portion, reads the tag portion. The second system transmits the identifier to the first system on a second channel. The first system reads the identifier, retrieves the keys, and transmits the decryption keys to the second system on the second channel. The second system receives the decryption keys and decrypts the data block using the decryption keys.

31 Claims, 19 Drawing Sheets

SYSTEM AND METHOD FOR SAFEGUARDING DATA BETWEEN A DEVICE DRIVER AND A DEVICE

BACKGROUND OF THE INVENTION

1. Field of the Invention

The present invention relates to data encryption. More specifically, the present invention relates to safeguarding the transfer of data within a device.

2. Background Information

With the proliferation of computers and networks, the amount and availability of digitized data available for viewing and listening has grown. However, with this growth in the amount and availability of information, content providers have desired greater protection of the data from unauthorized use.

In order to protect data from unauthorized use, conventional data protection techniques, such as, for example, data encryption, have been used to protect data as it is being transferred over a network or between devices. Content providers use a number of well known encryption techniques to encrypt sensitive data before transmission from one device, such as, for example, a satellite receiving dish, to a second device, such as, for example, a computer or set-top box.

Different conventional types of encryption techniques are used depending upon the source device of the data and the type of data bus being used for the transmission from one device to another. For example, data transmitted from a Digital Video Disk (DVD) player to a computer uses Content Scrambling System (CSS) encryption, and data transmitted over an IEEE 1394 bus use Digital Transmission Content Protection (DTCP). Data transmitted over other bus systems use a number of other encryption techniques. In order to decrypt the data as it is received, devices need to be able to decrypt data using the variety of techniques that are used to encrypt the data. Thus, a device that receives both CSS and DTCP encrypted data needs to know the techniques for decrypting both types of encrypted data.

The various encryption techniques employed only protect the data during transmission. Once the data is received, it must be decrypted in order for the receiving device to be able to process the data. Once the data is decrypted within the receiving device, the data is susceptible to unauthorized access and manipulation.

Moreover, these conventional systems do not protect the data inside an open architecture device, such as a personal computer. Conventional systems do not control what applications access the incoming data-stream, nor allow those applications to access the incoming data stream without being aware of the data originator outside the device.

SUMMARY OF THE INVENTION

According to one aspect of the invention, a machine readable medium provides instructions which when executed by at least one processor, cause the processor to perform operations. The operations include encrypting a payload of a data-stream data block with at least one key before transmitting the data-stream from a first system to a second system, replacing a portion of the payload with a tag that identifies at least one decrypting key to the first system before transmitting the data-stream from the first system to the second system, and setting a flag in a header of the data block that indicates that the payload has the tag before transmitting the data-stream from the first system to the second system.

BRIEF DESCRIPTION OF THE DRAWINGS

The present invention will be described by way of exemplary embodiments, but not limitations, illustrated in the accompanying drawings. Identical numerals indicate the same elements throughout the figures.

DETAILED DESCRIPTION

Figure 1:
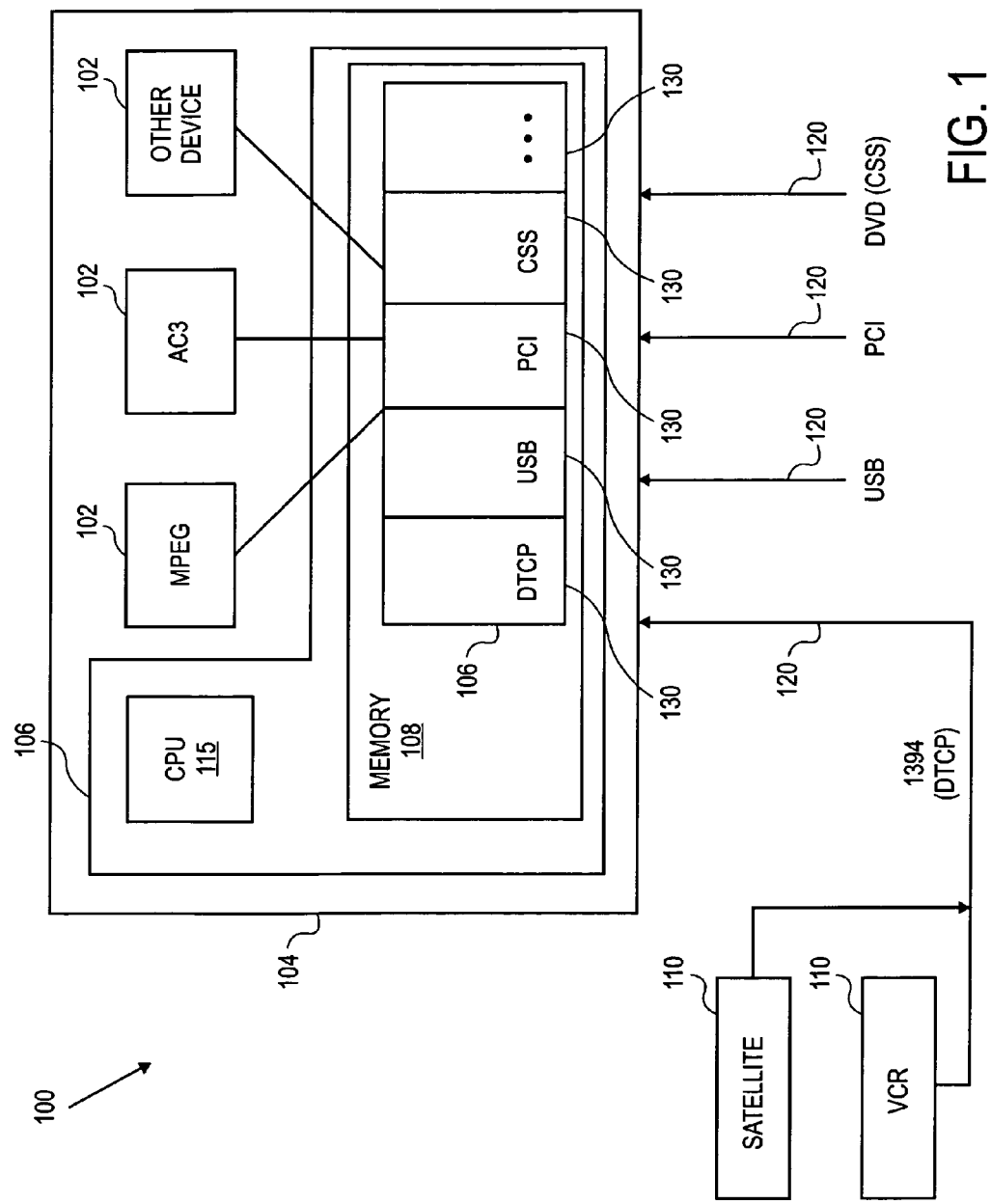
FIG. 1 is one embodiment for a data safeguarding system block diagram.

In the following description, various aspects and details of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific aspects and details. In other instances, well known features are omitted or simplified in order not to obscure the present invention.

Some portions of the descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a circuit that can include a programmed computer system, or similar electronic computing device. A computer system manipulates and transforms data represented as physical (electronic) quantities within the computer system's registers and memories into other data similarly represented as physical quantities within the computer system memories or registers or other such information storage, transmission or display devices.

The present invention also relates to apparatus including circuits for performing the operations herein. This apparatus may be specially constructed for the required purposes, or it may include a general purpose computer selectively activated or reconfigured by a computer program stored in the computer. Such a computer program may be stored in a computer readable storage medium. A machine readable medium includes any mechanism that provides (i.e. stores and/or transmits) information in a form readable by a machine such as a computer. For example, a machine readable medium includes, and is not limited to, read only memory (ROM); random access memory (RAM); magnetic disk storage media; optical storage media; flash memory devices; electrical, optical, acoustical or other form of propogated signals (such as carrier waves, infrared signals, digital signals, and so forth), or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

FIG. 1 is a block diagram of one embodiment for a data safeguarding system 100. Data safeguarding system 100 includes data safeguarding device 104, protocol specific input devices 110 and protocol specific buses 120. Data safeguarding device 104 includes decoding devices 102, and a protected content exchange (PCX) module whose preferred embodiment includes a memory 108, and a CPU 115 that executes programmed instructions stored in a memory 108. PCX module 106 includes a number of protocol specific exchange modules 130.

Protocol specific encrypted data is received over protocol specific bus 120 from protocol specific input devices 110. In the FIG. 1 example, encrypted data may be received over a 1394 DTCP bus from a number of input devices 110 such as a satellite dish or video recorder (VCR). Any of a number of protocol specific buses 120 may be connected to data safeguarding device 104 including, for example, a USB bus, a PCI bus, and a DVD bus. Once the encrypted data is received by data safeguarding device 104, CPU 115 directs the input to PCX module 106. Within PCX module 106, the appropriate protocol specific exchange module 130 is used to decrypt the encrypted input data stream. For example, if IEEE 1394 DTCP bus encrypted data is received, a DTCP exchange module 130 would be used to decrypt the input data. Input data is received and is decrypted on a block-by-block basis.

Initially, PCX module 106 negotiates a content channel encryption key with protocol specific input device 110. PCX module 106 then negotiates a PCX session key with the client decoding device 102. Decoding device 102 is the client that, in one embodiment, originally requested the data from device 110. Once the PCX session key is negotiated, PCX module 106 re-encrypts the payload of the protocol specific data using a randomly generated PCX content key and transfers the re-encrypted data (including header and payload) to the appropriate decoding device 102. Once decoding device 102 receives the re-encrypted data, decoding device 102 negotiates with the PCX module 106 to retrieve the PCX content key encrypted by the PCX session key. Once the appropriate PCX content is retrieved, decoding device 102 decrypts the payload data. Decoding device 102 then manipulates the unencrypted data. In one embodiment, decoding device 102 decodes the unencrypted data. For example, if MPEG data is requested by an MPEG decoder, the appropriate input device 110 sends the data over the bus 120 to data safeguarding device 104. CPU 115 executes the PCX module 106 which decrypts the MPEG input data stream using a content channel encryption key for the bus 120. The MPEG decoder and PCX module 106 negotiate a PCX session key. The payload MPEG data is re-encrypted with the randomly generated PCX content key and the re-encrypted data is sent to the MPEG decoder. PCX module 106 encrypts the PCX content key with the PCX session key. The MPEG decoder retrieves the encrypted PCX content key and decrypts the PCX content key with the PCX session key. In addition, the MPEG decoder uses the PCX content key to decrypt the payload data for playback. The MPEG decoder then retrieves the device key and decrypts the payload data for playback.

In one embodiment, data within system 100 is further protected from tampering or from unauthorized access by the use of a number of anti-tampering techniques such as, for example, self-modification of PCX module 106 code, the use of anti-debugging techniques, self-verification of PCX module 106 code, signature verification of PCX module 106 code, and other applicable anti-tampering techniques. The use of these anti-tampering techniques prevents unauthorized access or modification of PCX module 106 code which prevents the unauthorized access or modification of the data as it is being transferred through system 100.

Figure 2:
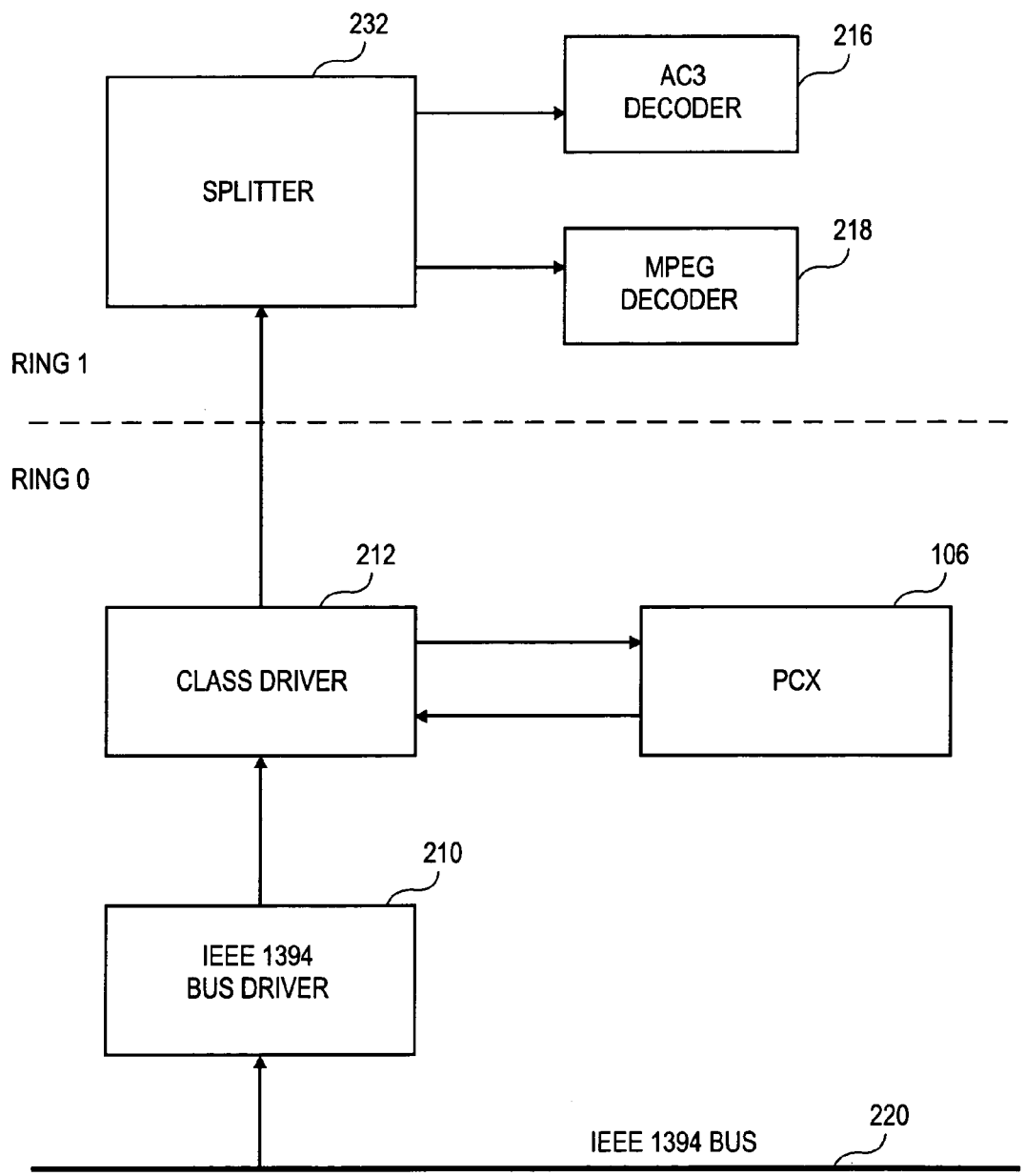
FIG. 2 is one embodiment for an architecture of a data safeguarding system block diagram.

FIG. 2 is a block diagram of one embodiment for an architecture of a data safeguarding system 100. Referring to FIG. 2, encrypted protocol specific data is received over IEEE 1394 bus 220 and transferred to IEEE 1394 bus driver 210. Bus driver 210 then sends the protocol specific data to class driver 212. PCX module 106 intercepts the protocol specific data and decrypts the data with a content channel encryption key. The content channel encryption key has originally been negotiated between PCX module 106 and protocol specific input device 110 before transmission. Once the data is decrypted, PCX module 106 re-encrypts only the MPEG portion of the payload of the data with a randomly generated PCX content key and encrypts the PCX content key with the appropriate PCX session key. This is repeated for the AC3 portion of the payload with a different randomly generated key and a different PCX session key. PCX module 106 sends the re-encrypted data back to class driver 212. The re-encrypted data is transferred to a splitter 232 which splits the data between the various decoding devices. In the FIG. 2 example, the splitter 232 splits the IEEE 1394 re-encrypted data to AC3 device 216 and MPEG device 218. MPEG decoder 218 and AC3 decoder 216 receive the appropriate encrypted PCX content key. MPEG decoder 218 and AC3 decoder 216 decrypt their PCX content key with their PCX session key. MPEG device 218 and AC3 device 216 then decrypt the re-encrypted data for playback using the appropriate PCX content key.

Thus, the data is protected from unwarranted hacking or copying within data safeguarding system 100. Within data safeguarding system 100, the transmission headers of the data are left decrypted while the payload of the data is re-encrypted by PCX module 106. Thus, the payload of the data is protected from unwarranted copying or hacking during transfer within system 100 while allowing untrusted components to access the portions of the data stream they need.

Figure 3:
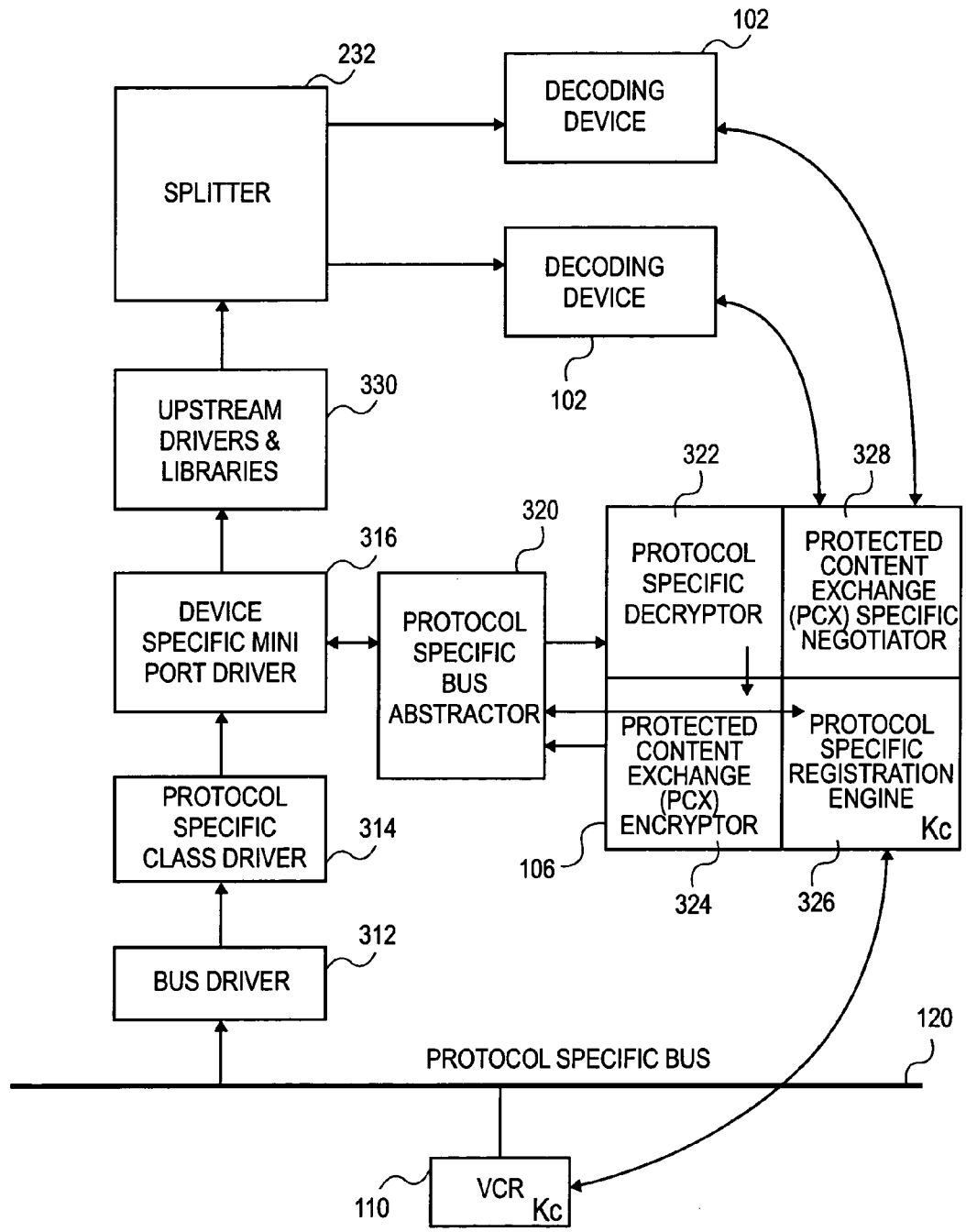
FIG. 3 is another embodiment for an architecture of a data safeguarding system block diagram.

FIG. 3 is a block diagram of another embodiment of an architecture of a data safeguarding system 100. Referring to FIG. 3, protocol specific input device 110 initially negotiates a content channel encryption key with protocol specific registration engine 326. Protocol specific input device 110 transmits the encrypted protocol specific data via protocol specific bus 120 to bus driver 312. Bus driver 312 transfers the encrypted protocol specific data to device specific mini port driver 316 via protocol specific class driver 314. Protocol specific bus abstractor 320 abstracts the encrypted protocol specific data from device specific mini port driver 316. The extracted encrypted data is transferred to PCX module 106. Within PCX module 106, the encrypted protocol specific data is decrypted using protocol specific decryptor 322. Protocol specific decryptor 322 decrypts the protocol specific data one block at a time. Each block of data contains a transmission header portion and a payload. In one embodiment, both the transmission header and payload portions are encrypted during transmission from source device 110 to data safeguarding system 100. In an alternate embodiment, only the payload may be encrypted. Depending on the specific data bus transmission protocol being used, protocol specific decryptor 322 decrypts either the entire data block or the payload only.

Each data bus transmission protocol requires a corresponding protocol specific decryptor 322. PCX negotiator 328 negotiates a PCX session key with the decoding device 102 that is the intended recipient of the protocol specific data. Once a session key is negotiated, protected content exchange (PCX) encryptor 324 re-encrypts the payload portion of the data with a randomly generated PCX content key to produce re-encrypted data. PCX encryptor 324 transfers the re-encrypted data to protocol specific bus abstractor 320 which, in turn, transfers the re-encrypted data to device specific mini port driver 316. Device specific mini port driver 316 sends the PCX re-encrypted data to the upstream drivers and libraries 330 which in turn transfers the PCX re-encrypted data to splitter 232.

Splitter 232 reads the transmission header of each re-encrypted data block and transfers the data block to the decoding device 102 corresponding to the information contained within the transmission header. In addition, in one embodiment, splitter 232 removes the transmission headers from the data block. Within the data, data blocks are intermingled so that a variety of data blocks are received by splitter 232. Thus, a video block may be received, then an audio block, then another video block, and so forth. The splitter transfers the payload sections of the blocks to the corresponding decoding device as indicated by the transmission header. Once the re-encrypted payload data is received by a decoding device 102, decoding device 102 retrieves the encrypted PCX content key from PCX negotiator 328. Decoding device 102 decrypts the content key using its PCX session key which was originally negotiated with PCX negotiator 328. The unencrypted data is then consumed by decoding device 102.

Figure 4:
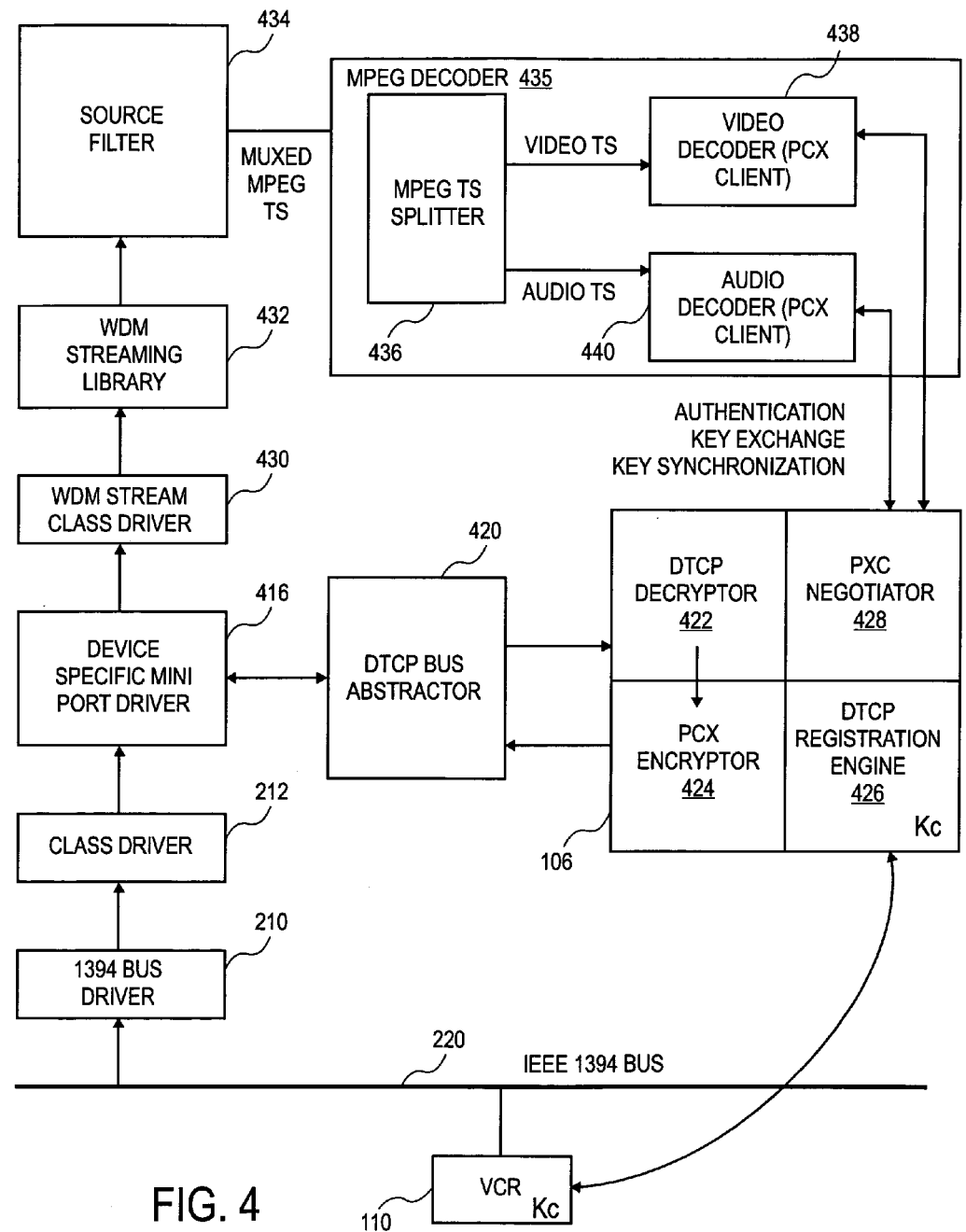
FIG. 4 illustrates an exemplary architecture of a data safeguarding system, such as that shown in FIG. 2.

FIG. 4 illustrates an exemplary architecture of safeguarding system 100. Referring to FIG. 4, protocol specific input device 110, such as a VCR, negotiates with a playback device such as MPEG decoder 435 to transmit a stream of encrypted data to MPEG decoder 435. Protocol specific input device 110 initiates the transmission of a stream of encrypted protocol specific data marked with the appropriate copy protection status (i.e., "copy-1-generation," "copy-never," or "no-more-copies"). The copy protection status is transmitted via the encryption mode indicator (EMI) bits within the transmission header of the data. If data requested by decoding device 102 (such as an MPEG decoder 435) is copy protected, protocol specific input device 110 may choose to transmit an empty data stream until at least one decoding device 102 has completed the appropriate authentication procedure required to access the content stream. Within data safeguarding system 100, protocol specific input device 110 negotiates authentication through PCX negotiator 328 and not directly with protocol specific input device 110. In the FIG. 4 example, VCR 110 negotiates authentication with DTCP registration engine 426. Once protocol specific input device (VCR) 110 and DTCP registration engine 426 have completed the required AKE procedure, a content channel encryption key may be exchanged between protocol specific input device 110 and DTCP registration engine 426. This content channel encryption key is used to encrypt the data by protocol specific input device 110 and decrypt the IEEE 1394 encrypted data by DTCP decryptor 422.

Once the content channel encryption key is negotiated, IEEE 1394 encrypted data is transferred from protocol specific input device 110 via IEEE 1394 bus driver 210, to class driver 212 and eventually to device specific mini port driver 416. DTCP bus abstractor 420 abstracts the IEEE 1394 encrypted data from device specific mini port driver 416 and transfers the IEEE 1394 encrypted data to PCX module 106. The IEEE 1394 encrypted data is decrypted by DTCP decryptor 422 one block at a time using the content channel encryption key previously negotiated by DTCP registration engine 426. In the IEEE 1394 example, both the transmission headers and the payload are encrypted by protocol specific input device 110. Thus, DTCP decryptor 422 decrypts both the transmission header and payload portions of the IEEE 1394 encrypted data block.

If video decoder 438 has not previously registered with PCX module 106, PCX negotiator 428 authenticates video decoder 438. During authentication, video decoder 438 is registered with PCX negotiator 428 and video decoder 438 negotiates a key exchange with PCX negotiator 428. The key exchange method between video decoder 438 and PCX negotiator 428 is similar to the key exchange method between decoding device 110 and DTCP registration engine 426 described above. Once a session key is negotiated between video decoder 438 and PCX negotiator 428, PCX encryptor 424 encrypts the payload of the data blocks using a randomly generated PCX content key. The re-encrypted IEEE 1394 data blocks are transferred to DTCP bus abstracter 420 for transfer to device specific mini port driver 416. The re-encrypted IEEE 1394 data is transferred via WDM stream class driver 430 and WDM streaming library 432 to source filter 434. At source filter 434, re-encrypted IEEE 1394 data intended for MPEG decoder 435 is split off from the other IEEE 1394 data and transferred to MPEG decoder 435. The re-encrypted IEEE 1394 data is muxed as MPEG transport stream (TS) to MPEG TS splitter 436. MPEG TS splitter 436 splits the video and audio portions of the MPEG TS and removes the transmission headers. The video portion of the TS is transferred to video decoder 438. Video decoder 438 requests the PCX content key from PCX negotiator 428. PCX negotiator 428 encrypts the PCX content key with the appropriate PCX session key and transfers it to video decoder 438. Video decoder 438 decrypts the PCX content key using the previously negotiated PCX session key and used the content key to decrypt the video data. In addition, the video decoder 438 consumes the data. In a similar manner, audio decoder 440 receives the audio TS and decodes the audio TS with a device key retrieved from PCX negotiator 428.

In standard MPEG video, the audio and video blocks are interwoven together within the input data stream. In order to separate the data, the MPEG splitter 436 reads the transport stream headers. Within data safeguarding system 100, MPEG decoder 435 only needs to use the PCX specific protocols in order to interact with PCX negotiator 428 and does not need to be able to use each individual data bus transmission protocol. PCX module 106 is able to translate the encrypted protocol specific data from any specific bus into PCX encrypted data that the MPEG decoder 435 is able to understand and decode. Thus, the re-encryption of the protocol specific data by PCX module 106 is independent of any specific bus protocol used by system 100. Decoding devices 102 are independent of the command protocol of the specific bus. The bus abstractor 420 abstracts the DTCP status structure, encapsulates the status structure in the proper command protocol, and transmits the encapsulated protocols to the driver 416 and vice versa. In this manner, decoding devices 102 are capable of receiving encrypted data from any protocol specific bus 120 without negotiating the content channel encryption key with the input devices 110 or knowing the encryption protocol for the specific buses 120. As existing bus protocols change and new bus protocols are developed, PCX module 106 may be updated. However, decoding devices 102 only need to be able to talk with PCX module 106 and only need to be updated when the PCX module 106 negotiation protocols are updated.

PCX module 106 may be implemented in software or hardware. The PCX module 106 may be incorporated within RAM memory of a personal computer or may be contained within flash memory which is attached to a CPU or other data processing device. Thus, PCX module 106 is easily updated independent of decoding devices 102.

Figure 5:
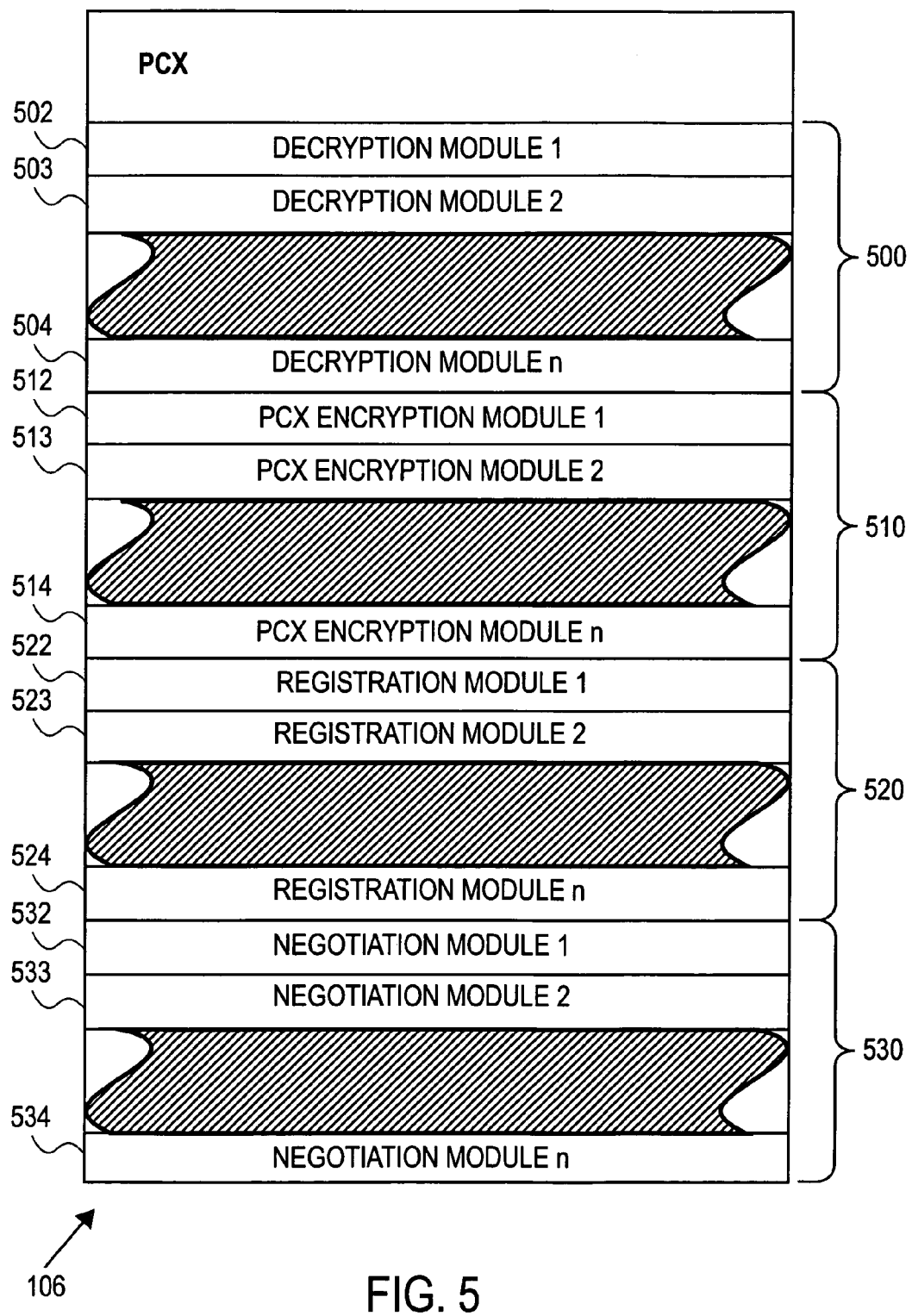
FIG. 5 is one embodiment for a protected content exchange (PCX) module of FIG. 2 block diagram.

FIG. 5 is a block diagram of one embodiment for a protected content exchange (PCX module 106). Referring to FIG. 5, PCX module 106 contains protocol specific decryption modules 500, PCX encryption modules 510, protocol specific registration modules 520, and PCX negotiation modules 530. A protocol specific decryption module 500 may be maintained for each protocol specific bus connected to data safeguarding system 100. Thus, PCX module 106 may contain decryption module 1 (502) through decryption module n (504). PCX module 106 may contain a number of PCX encryption modules 510. Thus, PCX module 106 may contain PCX encryption module 1 (512) through PCX encryption module n (514) for the encryption of a number of devices. In an alternate embodiment, only one PCX encryption module 510 may be maintained.

PCX module 106 includes a number of registration modules 520 for the negotiation of content channel encryption keys with protocol specific input devices 110. In one embodiment, PCX module 106 may contain registration module 1 (522) through registration module n (524) corresponding to each protocol specific bus connected to the system.

PCX module 106 contains PCX negotiation modules 530 which are utilized by data safeguarding system 100 to negotiate key exchanges with decoding devices 102. In addition, the negotiation modules authenticate the decoding devices and maintain key synchronization between PCX module 106 and decoding devices 102. In one embodiment, PCX module 106 includes from negotiation module 1 (532) through negotiation module n (534) corresponding to individual decoding device 102.

Figure 6A:
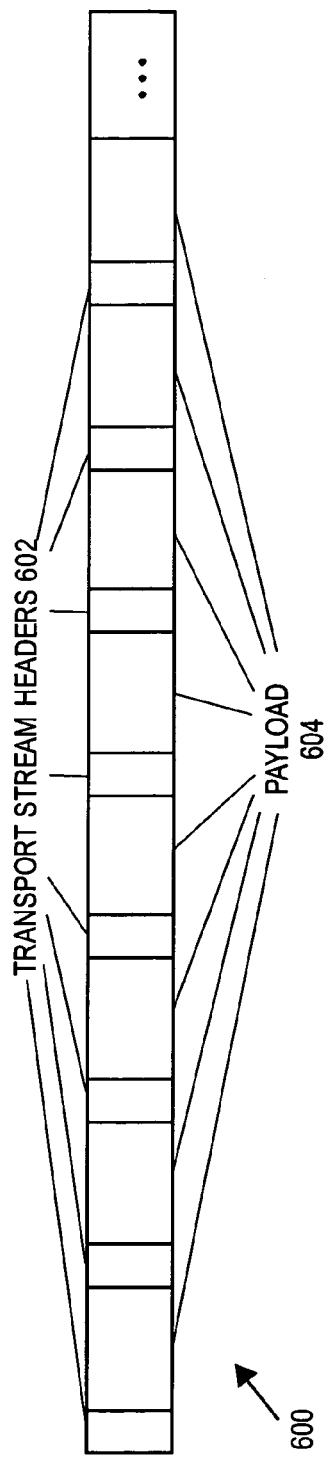
FIG. 6a is one embodiment for an encrypted data stream block diagram.

FIG. 6A is a block diagram of one embodiment of an encrypted data stream 600. Referring to FIG. 6A, encrypted data stream 600 contains a number of blocks of data, each block containing a transport header 602 and a payload 604. In one embodiment, the payload 604 and the transport stream header 602 may be 188 bytes in length. Within the encrypted data stream 600, each block of data may be for a different device 102. For example, MPEG audio and video data may be interleaved within encrypted data streams 600. In addition, MPEG audio and video data may be interleaved with AC3 and other data.

Figure 6B:
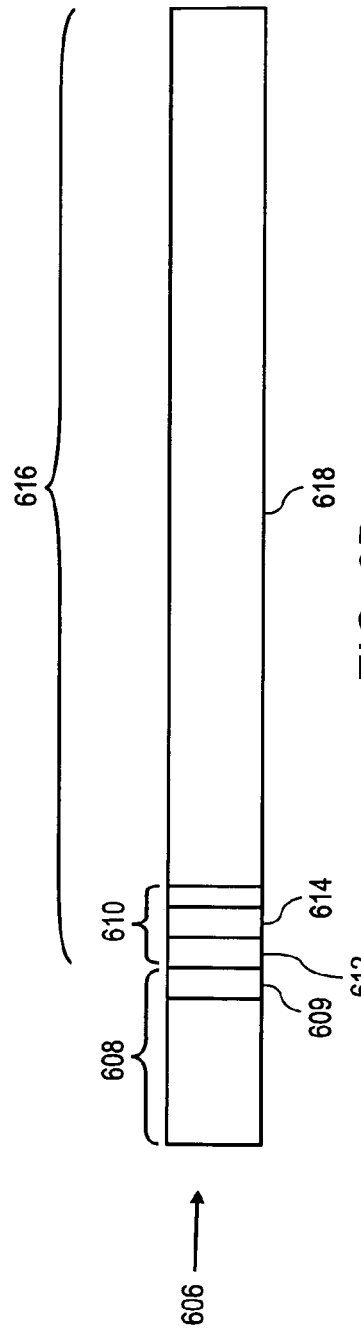
FIG. 6b is one embodiment for a PCX replacement block diagram.

Referring now to FIG. 6B, in an embodiment of the present invention a PCX data block 606 sent from a PCX module 106 to an application decoder 102 includes both a header 608 portion and a payload 616 portion. The header 608 portion is generally conventional and includes conventional block characteristic information, and a flag 609 of the present invention that indicates whether the payload 616 of the block data contains a tag 610, or alternatively whether the payload contains a PCX encrypted data. In one embodiment, the header 608 is a packetized elementary stream (PES) header. The payload 616 portion of the present invention includes the tag 610 at a predetermined position that includes an identifier information that can be sent to the PCX module for accessing the decryption key(s) for the payload as well as preferably a portion of the payload replaced by the tag, disclosed presently. The tag preferably includes a stream identifier datum 612 for distinctly identifying the data stream, and a source datum 614 for distinctly identifying the stream source, enabling the application decoder 102 to transmit to a PCX module a message that requests the decryption keys and preferably the portion of the payload for the identified data-stream from a PCX module that can access the decryption keys and preferably portion of the payload. In a safeguarding system 104 in which a data-stream identifier unambiguously includes the data sufficient to access the decryption keys and preferably the portion of the payload, the tag should only include the data-stream identifier. In other systems, particularly those have a plural number of PCX modules, the tag should also include an additional datum such as the source datum 614. When the payload includes the tag 610, the encrypted data stream is modified to replace a portion of the payload that is the size of the tag, with the tag. Thus, the payload content data 616 of the present invention is an encrypted form of the conventional data block that has a smaller portion replaced by the tag 610. This shall be presented more in subsequent paragraphs with reference to FIGS. 14 and 17.

Figure 14:
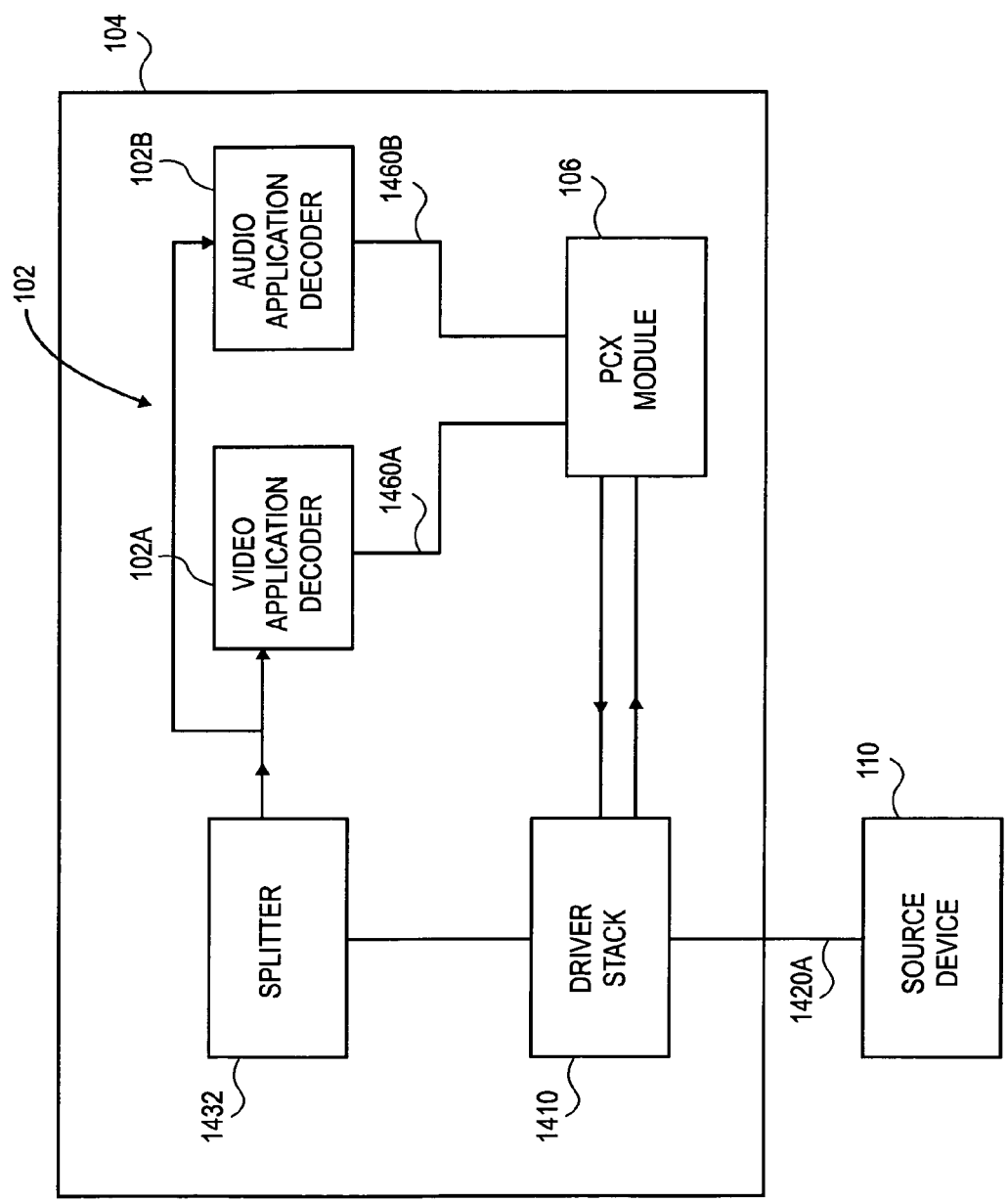
FIG. 14 is one embodiment of a system block diagram showing the functional connection between a PCX module and an application decoder for transferring a data-stream to a decoder application when they are separate physical devices.

Referring now to FIG. 14, the block diagram depicted includes the PCX module 106, and the decoders 102, that contain circuitry of the present invention. The preferred embodiment of the application decoder 102 and the PCX module 106 each include a processing unit that responds to program instructions of the present invention. Alternatively, as is well known to practitioners of the art, the circuitry does not require a processing unit and can be implemented as a fixed digital circuit without the configurable circuit advantages provided by a programmed processing unit.

The source device 110 transmits an exemplary two intertwined data-streams, a video data-stream and an audio data-stream, to a device specific driver stack 1410 of data safeguarding device 104 via a bus 1420a. Each data-stream includes a sequence of data blocks, each data block having a conventional header and payload. The driver stack 1410 retransmits each data-stream to an appropriate PCX module 106. The PCX module 106 includes at least one decryptor and protocol specific registration engine, and at least one PCX encryptor and PCX negotiator, described herein with reference to FIGS. 3 and 4. Each data-stream transmitted from the source device 110 is optionally encrypted. The data-stream payloads are each encrypted by a PCX module 106 before transmission to an application decoder 102, or alternatively optionally encrypted by a PCX module 106 if an individual data stream was transmitted from a source device 110 encrypted, and subsequently decrypted, by the PCX module 106, so as to distinctly encrypt the data within the data safeguarding device 104.

The embodiment portrayed in FIG. 14 includes an application decoders 102a and 102b that are each a physically separate device from the PCX module 106. There are two separate data transmission channels connecting the PCX module 106 to each physically separate application decoder 102a and 102b. One of the separate data transmission channels transmits the data-stream from the PCX module 106 to the application decoder. The other separate data transmission channel transmits the non-data-stream data between the PCX module 106 and an application decoder 102, so these transmissions do not impact other components that access the data-stream transmission. In the embodiment portrayed in FIG. 14, each channel is a separate physical transmission line.

The data-stream data transmission path includes the PCX module 106 that sends the exemplary intertwined data-stream to a driver stack 1410. The driver stack 1410 sends the data-stream to a splitter 1432, wherein each separate data-stream is then separated and separately transmitted to an appropriate exemplary application decoder 102a or 102b. The video data-stream is routed to the exemplary video application decoder 102a, and the exemplary audio data-stream is routed to the exemplary audio application decoder 102b. The non-data-stream data transmission path between the PCX module 106 and the decoder 102a is exemplary bus 1460a, and between the PCX module 106 and the decoder 102b is exemplary bus 1460b, wherein buses 1460a and 1460b may be identical physical devices. The non-data-stream data includes the identifier necessary for the PCX module to access the data block decryptor keys and optional portion of the payload. The non-data-stream data preferably includes a data-stream identification datum and a source identification datum from the decoders 102a and 102b, and the encryption keys and the portion of a replaced payload from the PCX module 106. The preferred embodiment non-data-stream data additionally includes an authentication and key exchange (AKE) from the PCX module 106 to the exemplary application decoders 102a and 102b to enable a separately encrypted tag and the aforementioned encryption keys to be themselves encrypted, assuring the embodiment of an authorized and secure decoder(s) 102 in communication with the PCX 106 module and receiving the data-stream. The precise method of transmitting and receiving the data-streams, datum identifiers, and encryption keys, shall be described with reference to FIG. 17.

Figure 15:
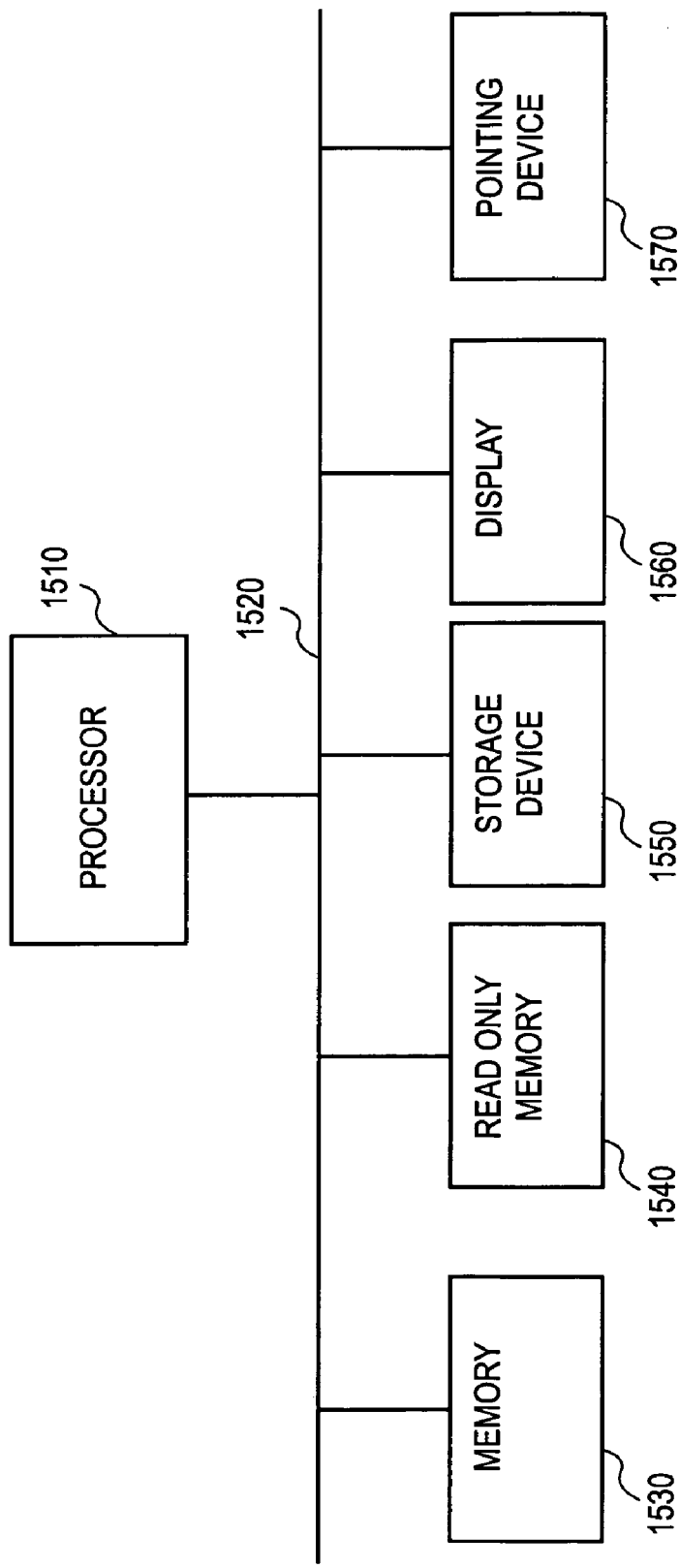
FIG. 15 is an exemplary computer system that is related to the use of the present invention, according to an embodiment.

Referring now to FIG. 15, a programmed processor embodiment of the PCX module 106 runs on a computer system that can include an exemplary unitary processor 1510 that processes data signals. The processor 1510 may be a complex instruction set computer (CISC) microprocessor, a reduced instruction set computing (RISC) microprocessor, a very long instruction word (VLIW) microprocessor, a processor implementing a combination of instruction sets, or other processor device. However, it is understood that the present invention may be implemented in a computer system having multiple processors. The processor 1510 is coupled to a CPU bus 1520, or other communication device for communicating information, that transmits data signals between processor 1510 and other components in the PCX module 106. The computer system includes a memory 1530, or other computer readable media that is commonly a random access memory (RAM) device or other dynamic storage device, that can be used to store temporary variables or other intermediate information during execution of instructions by processor 1510, and is coupled to the bus 1520. The PCX module 106 also includes a read only non-volatile memory such as a semiconductor Read Only Memory (ROM) device, and/or other static storage device 1540 coupled to bus 1520 for storing static information and instructions for processor 1510. Data storage device 1550 is another computer readable medium coupled to bus 1520 for storing information and instructions, and can be such exemplary computer readable media as magnetic disk, and/or an optical disk and corresponding drives. Display 1560 is coupled to bus 1520 for displaying data generated by the processor 1510, and mouse 1570, or other exemplary selecting or pointing device, and keyboard 1580, each couple to the bus 1520.

Figure 16:
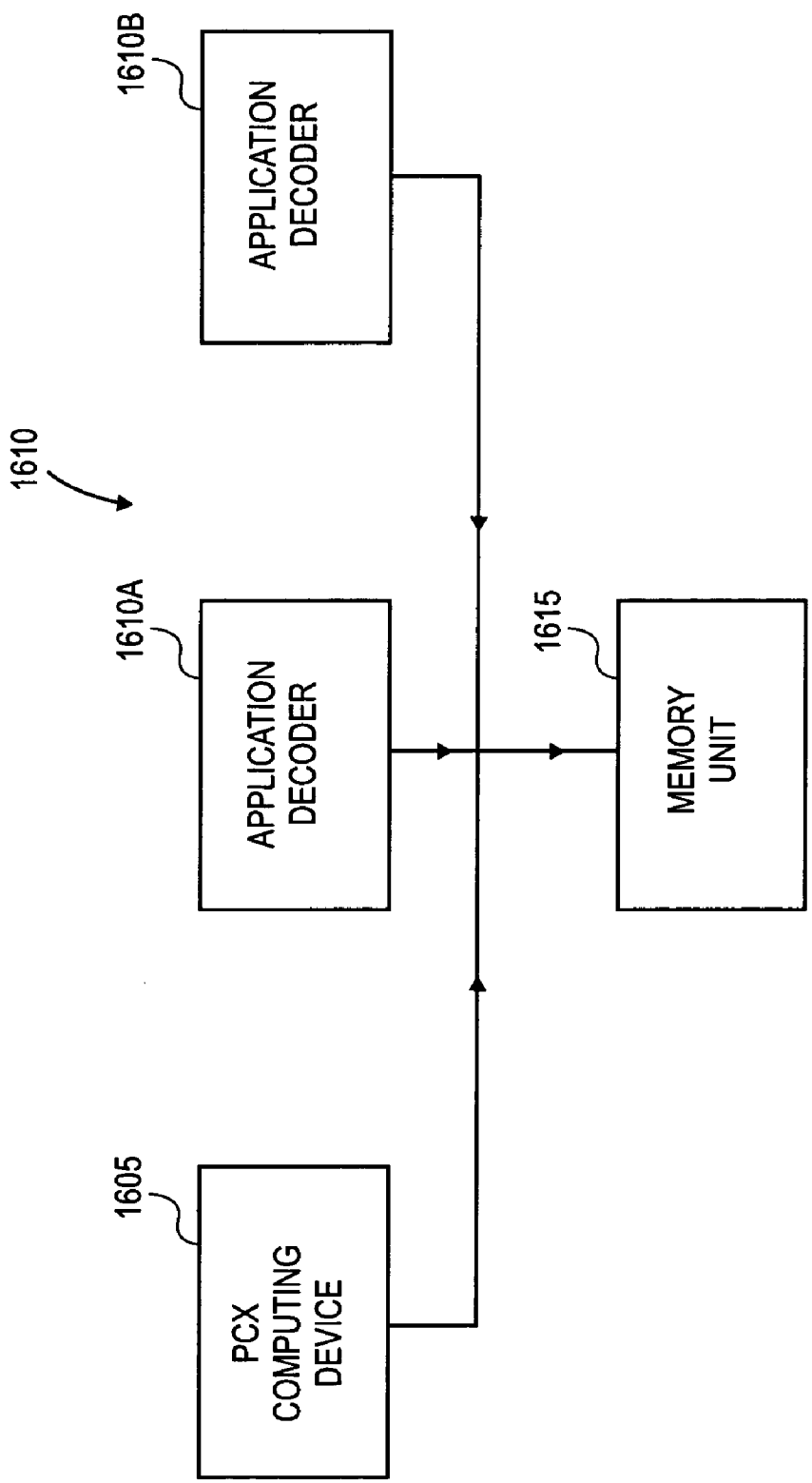
FIG. 16 is one embodiment of a system block diagram showing the functional connection between a PCX module and an application decoder when they access a shared memory device.

Referring to FIG. 16, a PCX module 106 includes a programmed processing device 1605 that accesses a memory unit 1615 for transmission of the encrypted data stream to that memory unit 1615, and for transmission of the keys(s) and tag data. The system includes the exemplary application decoders 1610, embodied by an exemplary video data application decoder 1610a and an exemplary audio data application decoder 1610b. The application decoders 1610 each access the memory unit 1615 for the encrypted data stream. The tag data is read by the decoders 1610, and sent back to the memory unit 1615, for access by the PCX computing device 1605, and a placement of the relevant key(s) and portion of the payload into a memory location that a decoder 1610a or 1610b accesses for a read of the key(s) and the replaced portion of payload data. Alternatively, the PCX computing device 1605 can store the key(s) and payload portion in the memory unit for a direct read by an application decoder 1610 according to the content of the transmitted tag data. In another embodiment, as disclosed herein, the application decoder(s) 1610 and the PCX computing device can be embodied by a unitary computing device that executes both program instructions for the application decoder(s), and the PCX module.

Figure 17:
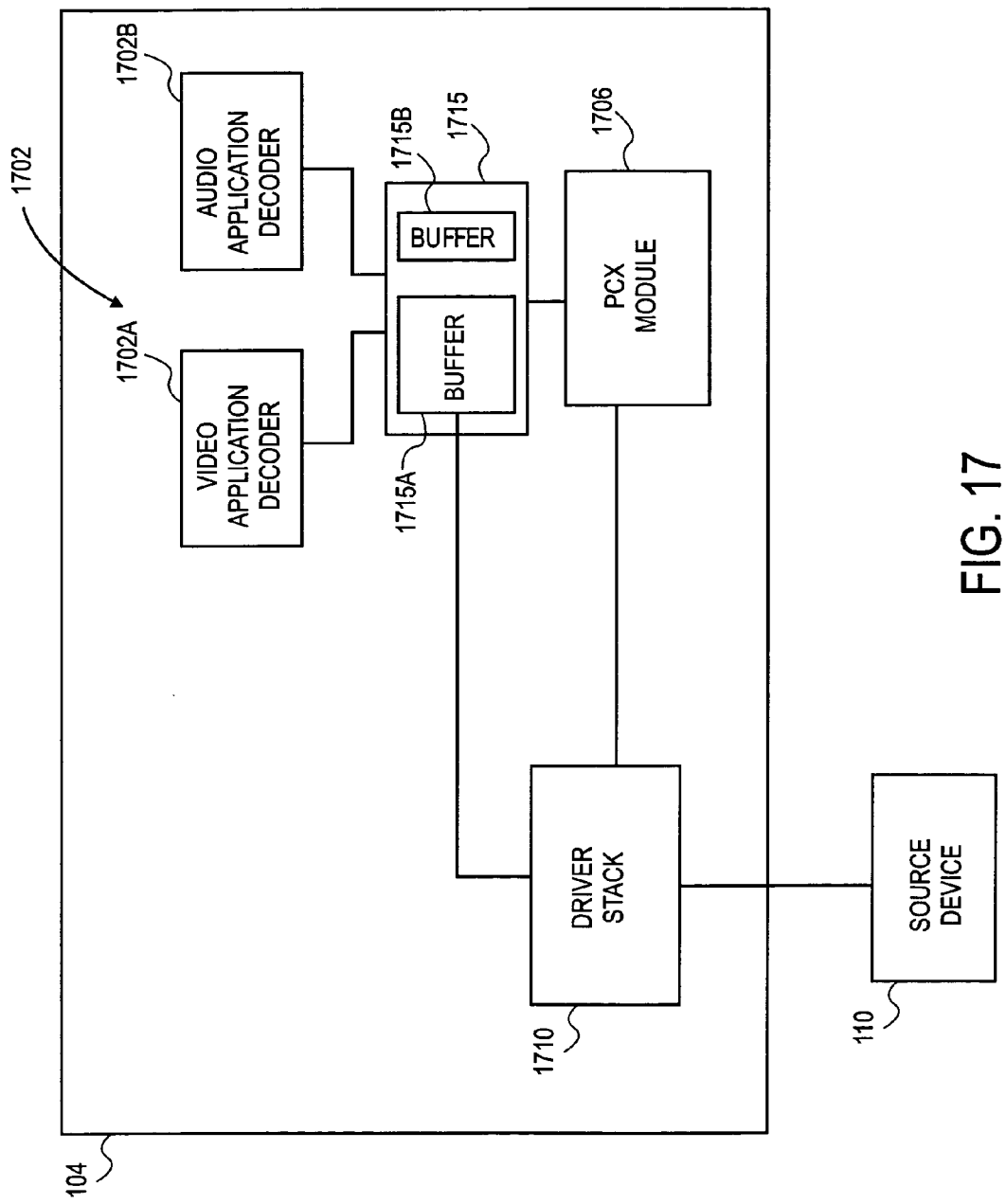
FIG. 17 is one embodiment of a system block diagram of a shared memory device safeguarding system.

Referring to FIG. 17, a preferred embodiment block diagram depicted includes the PCX module 1706, the decoders 1702, and the driver stack 1710 that contain circuitry of the present invention. As formerly described with reference to FIG. 14, the source device 110 transmits an exemplary two intertwined data-streams to a device specific driver stack 1710 of data safeguarding device 104 via a bus 1420a. The data safeguarding device 104 includes a shared memory 1715. The driver stack 1710 moves each block to memory 1715 where it is written into a buffer 1715a of the memory 1715, and sends to the PCX module 1706 a pointer to the buffer 1715a for each block. The PCX module 1706 accesses each block according to its memory pointer and distinctly encrypts the data within the safeguarding device 104 as described with reference to FIG. 14.

The PCX module 1706 additionally replaces a portion of the payload with the tag, and marks a flag, as described with reference to FIGS. 6b and 14, and as will be described with reference to FIG. 18. The memory 1715 includes a second buffer 1715b that both the exemplary decoders 1702a and 1702b and the PCX module 1706 write to and read from for transmission between them of non-data stream data described with reference to FIG. 14, and FIG. 18. The PCX module may also include a splitter circuit that places a pointer in the buffer 1715b identifying to the application decoders 1702 the data-streams directed to each separate exemplary application 1702a and 1702b, ort alternatively transmit that data over a separate physical line directly to the application decoders 1702 in a configuration that includes a pre-existing physical bus as depicted with reference to FIG. 14. The splitter circuit may be physically separate form the PCX module 1706 including a separate processor that may receive pointers directly from the driver stack 1710, and may write into a separate buffer in the memory 1710. In the embodiment herein portrayed. The interface between a decoder 1702a and 1702b and the buffer 1715a is a first channel, and the interface between a decoder 1702a and 1702b and the buffer 1715b is a second channel.

Figure 18:
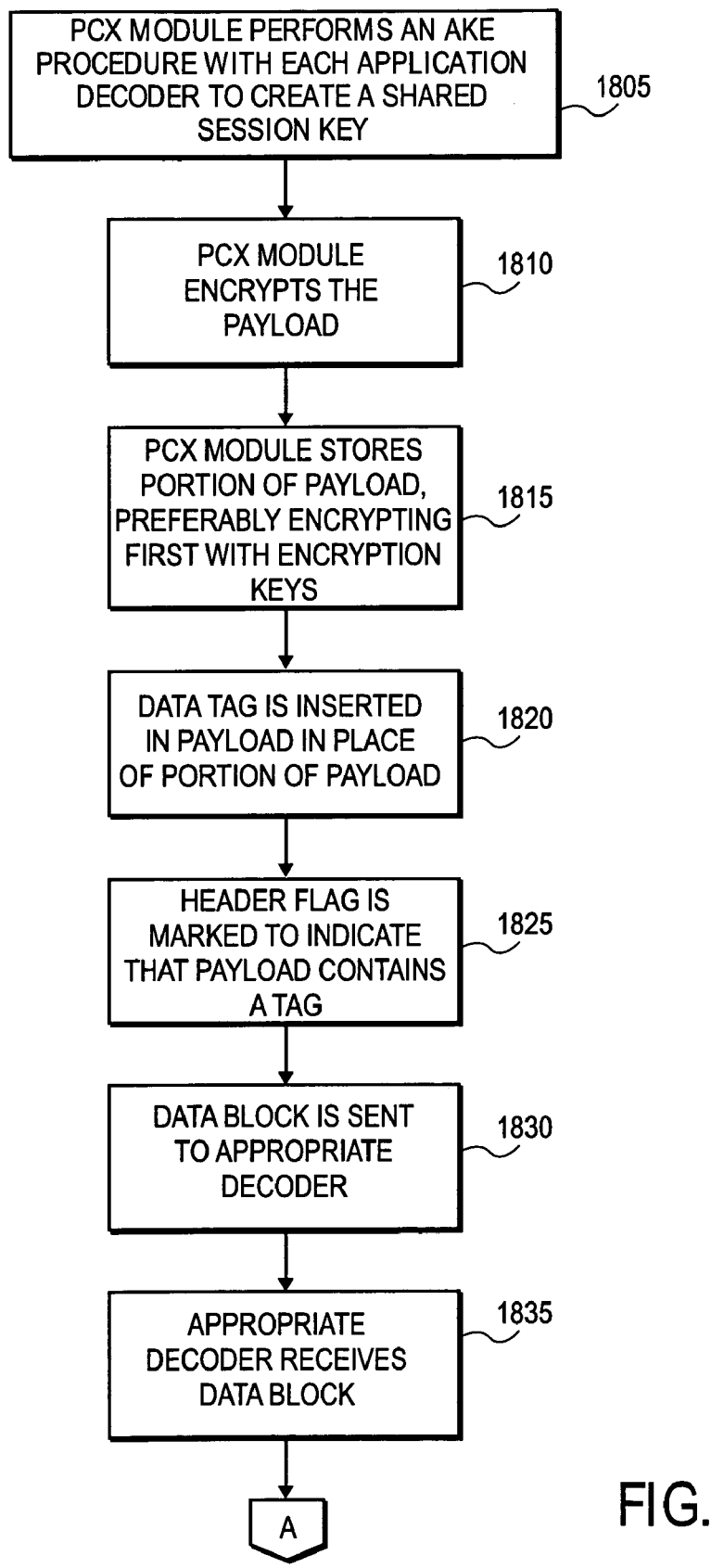
FIG. 18 is a flow diagram of one embodiment for transferring a single data-stream and decryption keys to an application decoder.
Figure 18:
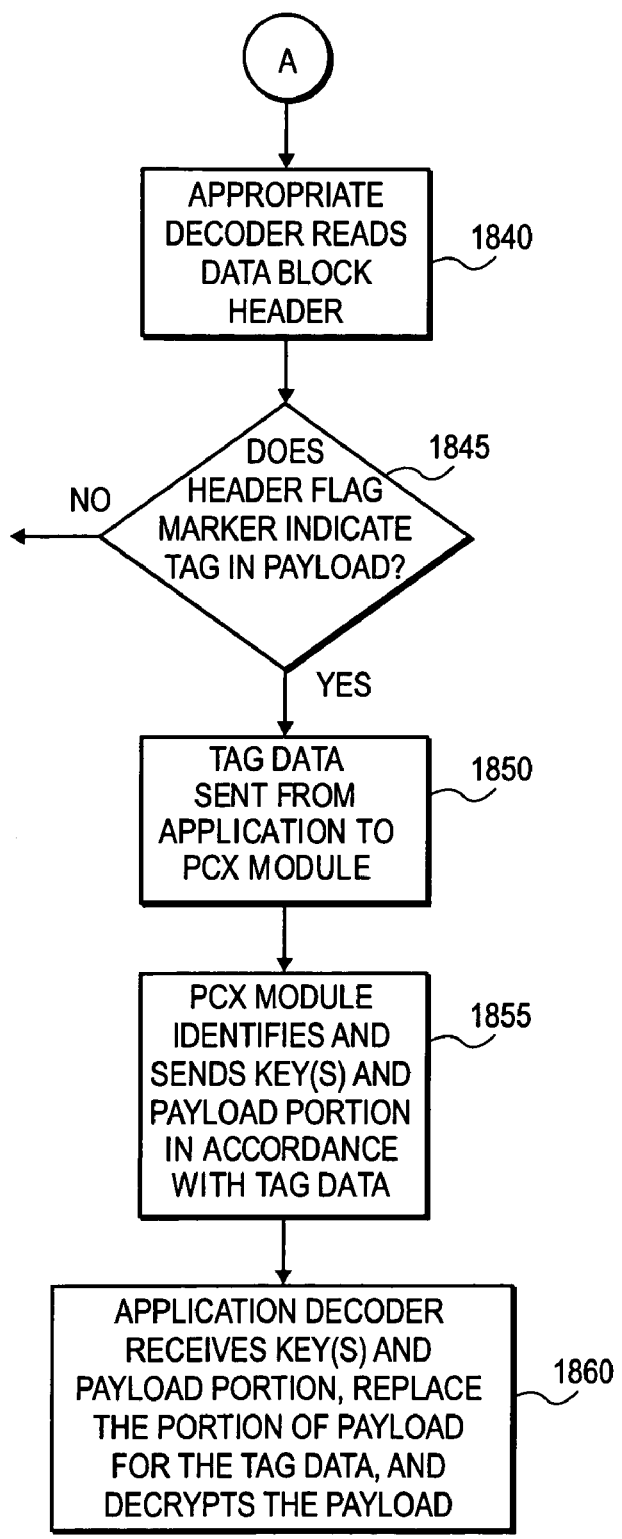

Referring now to FIG. 18, the method and circuit herein described applies to a system of a decoding application 102, portrayed with reference to both FIG. 14, wherein an exemplary video decoder 102a and audio decoder 102b, and a physically separate PCX module 106, in which a data stream is sent to the PCX module from a source device 110; and analogously to FIG. 17 as an exemplary video decoder 1702a and audio decoder 17102b, and a physically separate PCX module 1706; as well as a system implemented by a processing device that is both a PCX module and an application decoder(s). As has been described with reference to FIG. 14, the preferred circuit includes a programmed processing device, but alternatively can be implemented by digital circuitry that does not include a programmed processing device, or can be implemented alternatively by a programmed processing device in at least one application decoder and/or the PCX module, or a processing device that is embodied partially, but not completely, by a programmed processing device.

The data stream transmitted to the safeguarding system is alternatively unencrypted, or encrypted and has been decrypted by the PCX module as described herein. At block 1805, the PCX module not necessarily but preferably performs an AKE procedure with each decoder to create a shared session key with each decoder. This session key will be used to encrypt the decryption keys before they are sent back to the decoder. Additionally this AKE will assure that the applications are authorized to access the PCX module encryption system. At block 1810, the PCX module encrypts the data block payload. The payload is encrypted using at least one key. At block 1815, the PCX source module stores a tag-sized portion of the encrypted payload for subsequent transmission to an application decoder. In the preferred embodiment, the entire payload is encrypted using the key(s). In the present invention, the stored portion can alternatively be encrypted separately with the key(s), or can be optionally left unencrypted. The payload in a following block shall be decrypted in accordance with the encryption characteristic of the stored portion.

At block 1820, a tag is inserted into the payload in the place of the saved payload portion. The tag includes in the preferred embodiment both an identification of the data stream 612 and an identification of the data stream source 614, the source identified because a safeguarding system may include more than one source circuit. The encryption keys and the saved portion of the payload are each referenced to the data-stream identifier. At block 1825, a flag in the header is marked to indicate that the block contains a payload tag. At block 1830, the data block is sent to the appropriate decoder 102 along the data-stream transmission channel described with reference to FIG. 14, or alternatively described with reference to FIG. 17. At block 1835, the appropriate application decoder has received the data block from the splitter 1432 with reference to FIG. 14. At block 1840 the application decoder that has received the data block reads the header flag position and at block 1845 determines whether the header flag is marked. If the header flag indicates that the payload does not contain a marked flag, control passes out of this flow. If the header flag indicates that the payload does contain a tag, control passes to block 1850 where the data stream identifier datum and the source datum are read and an identifier of each is sent back to each PCX module or alternatively, only the data stream identifier is sent back to the source module circuit identified by the source datum. In the embodiment in which the application decoder module, and the PCX module are physically separate devices, the identifier(s) are sent back to the PCX module along the separate channel as herein described.

At block 1855 the appropriate PCX module reads the data stream identifier. The proper application keys and portion of the payload are determined by reference to the data stream identifier. The second set of encryption key(s) and the stored portion of the payload that was replaced by the tag are transmitted to the target application decoder in accordance with the data stream identifier. In the embodiment in which the application decoder module and the PCX module are physically separate devices, the identifiers are sent back to the PCX module along the separate channel as herein described. At block 1860, the appropriate application decoder receives the decryption keys key(s) and the payload portion transmitted from the PCX module at block 1855, and decrypts the key(s) with the session key, replaces the payload portion from the tag position, and then decrypts the payload using the decrypted key(s).

Figure 7:
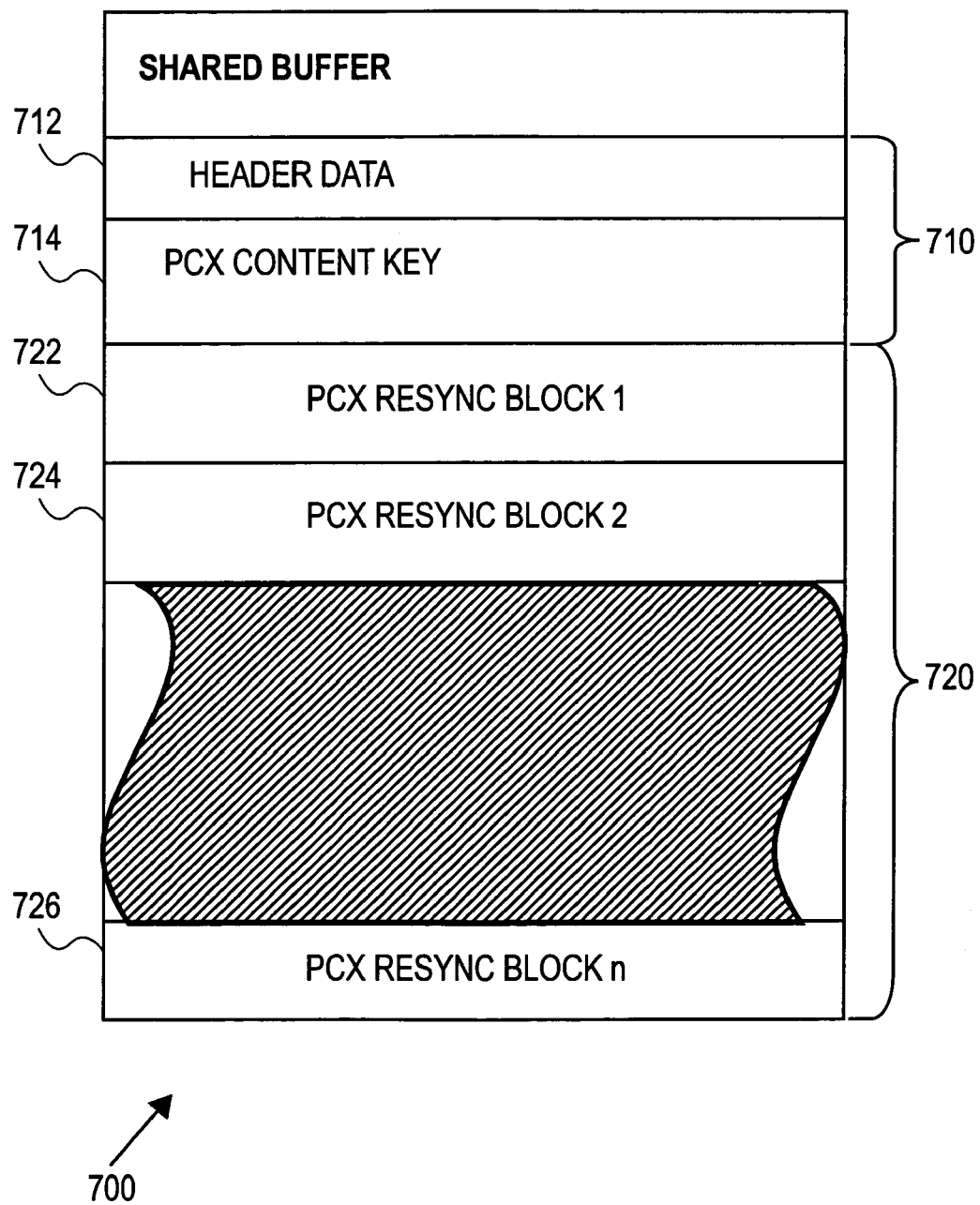
FIG. 7 is one embodiment for a shared buffer block diagram.

FIG. 7 is a block diagram of one embodiment for a shared buffer 700. Shared buffer 700 includes a device specific header 710 and PCX resync blocks 720. Device specific header 710 includes a header data portion 712 and PCX content key 714. In one embodiment, PCX resync blocks 720 contain from PCX resync block 1 (722) through PCX resync block n (726). Header data 712 identifies the decoding device 102 corresponding to the shared buffer 700. In one embodiment, each decoding device 102 corresponds to a unique shared buffer 700. In an alternate embodiment, all decoding device 102 use a single, shared buffer 700. Shared buffer 700 may be any applicable data structure such as, for example, an array, linked list, or other applicable data structure. PCX content key 714 is encrypted with the previously negotiated PCX session key and is the key that will be used to decrypt the payload.

Figure 8:
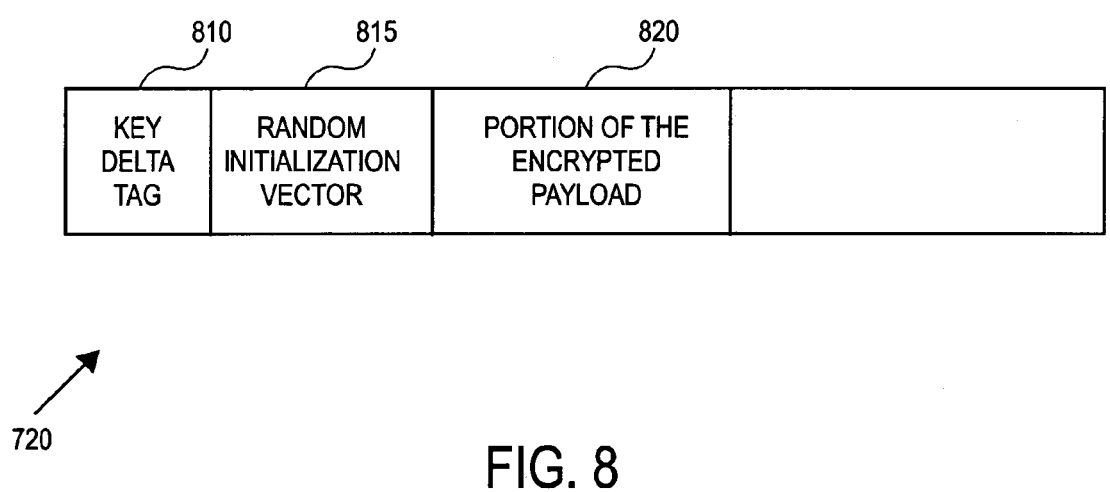
FIG. 8 is one embodiment for a PCX resync block block diagram.

FIG. 8 is a block diagram of one embodiment for PCX resync block 720. Referring to FIG. 8, PCX resync block 720 includes key delta tag 810, random initialization vector 815, and portion of the encrypted payload data 820. PCX resync block 720 is utilized for key synchronization as described below.

Figure 9:
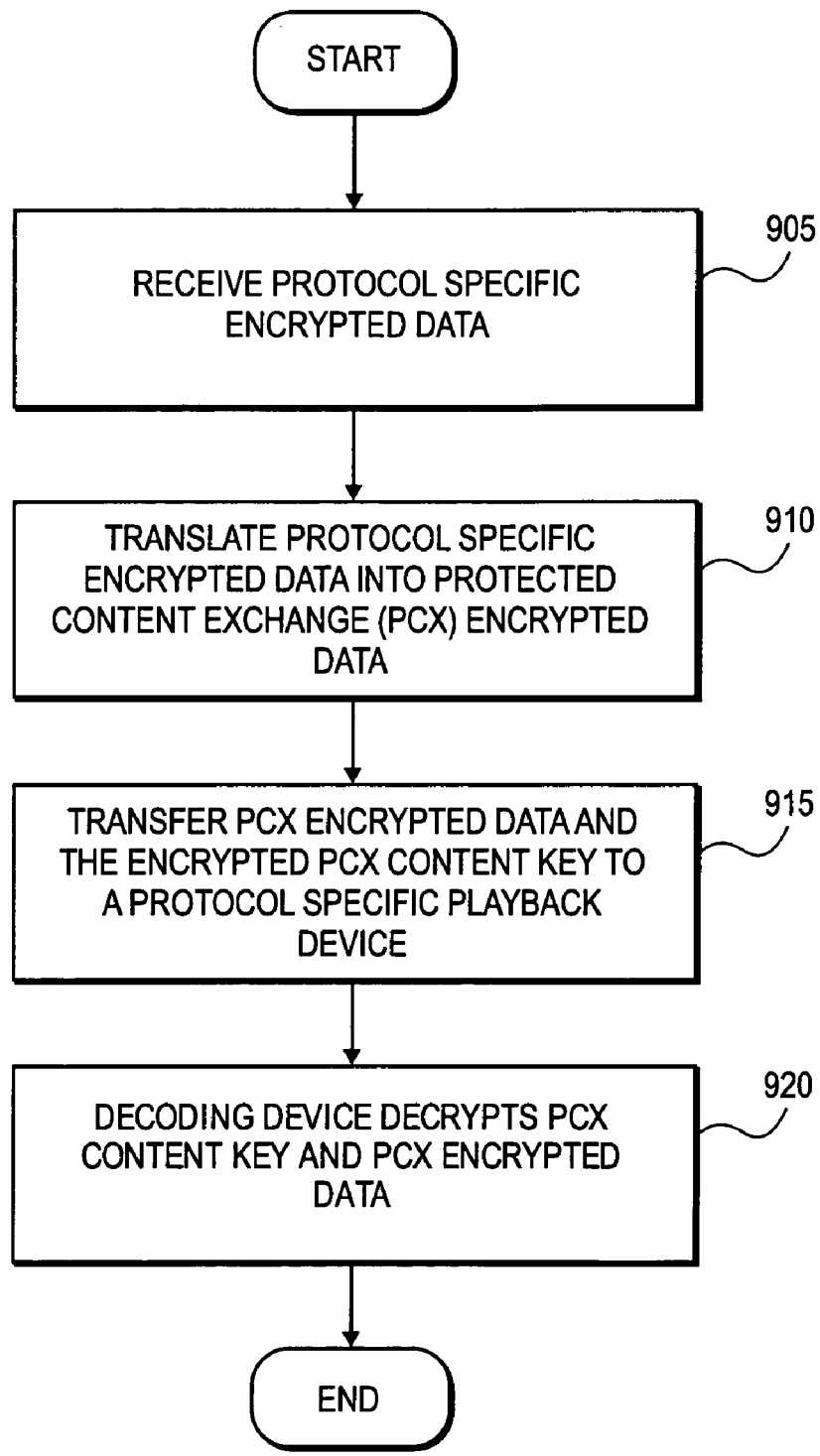
FIG. 9 is a flow diagram of one embodiment for safeguarding protocol specific data within a device.

FIG. 9 is a flow diagram of one embodiment for safeguarding protocol specific data within a device. Initially at processing block 905, data safeguarding system 100 receives encrypted protocol specific data. The encrypted protocol specific data may be encrypted for any of a variety of data bus security protocols such as, but not limited to Digital Transmission Content Protection (DTCP), Content Scramble Systems (CSS), and Content Protection for Recordable Media (CPRM). The protocol specific data is received in processing blocks one block at a time.

At processing block 910, the encrypted protocol specific data is translated into protected content exchange (PCX) re-encrypted data. The translation of the data includes decrypting the encrypted protocol specific data using a content channel encryption key to produce decrypted data. Once the data is decrypted, the payload of the decrypted data is re-encrypted using a PCX content key to produce PCX re-encrypted data. The content channel encryption key is negotiated by a protocol specific registration engine 326 with protocol specific input device 110 upon initiation of the transfer of protocol specific data from the protocol specific input device 110 to decoding device 102. Once protocol specific input device 110 and protocol specific registration engine 326 have completed the required AKE procedure, a content channel encryption key may be exchanged between protocol specific input device 110 and protocol specific registration engine 326. This content channel encryption key is used to encrypt the data by protocol specific input device 110 and decrypt the encrypted protocol specific data by protocol specific decryptor 322. The session key is negotiated between PCX negotiator 328 and decoding device 102.

After the data is re-encrypted, the re-encrypted data and the PCX content key encrypted by the PCX session key are transferred to the decoding device 102 at processing block 915. In one embodiment, the re-encrypted data is split into a number of data streams which are transferred to appropriate decoding devices 102. At processing block 920, decoding device 102 decrypts the PCX content key and uses it to decrypt the re-encrypted data. The unencrypted data is further decoded by decoding device 102.

Figure 10:
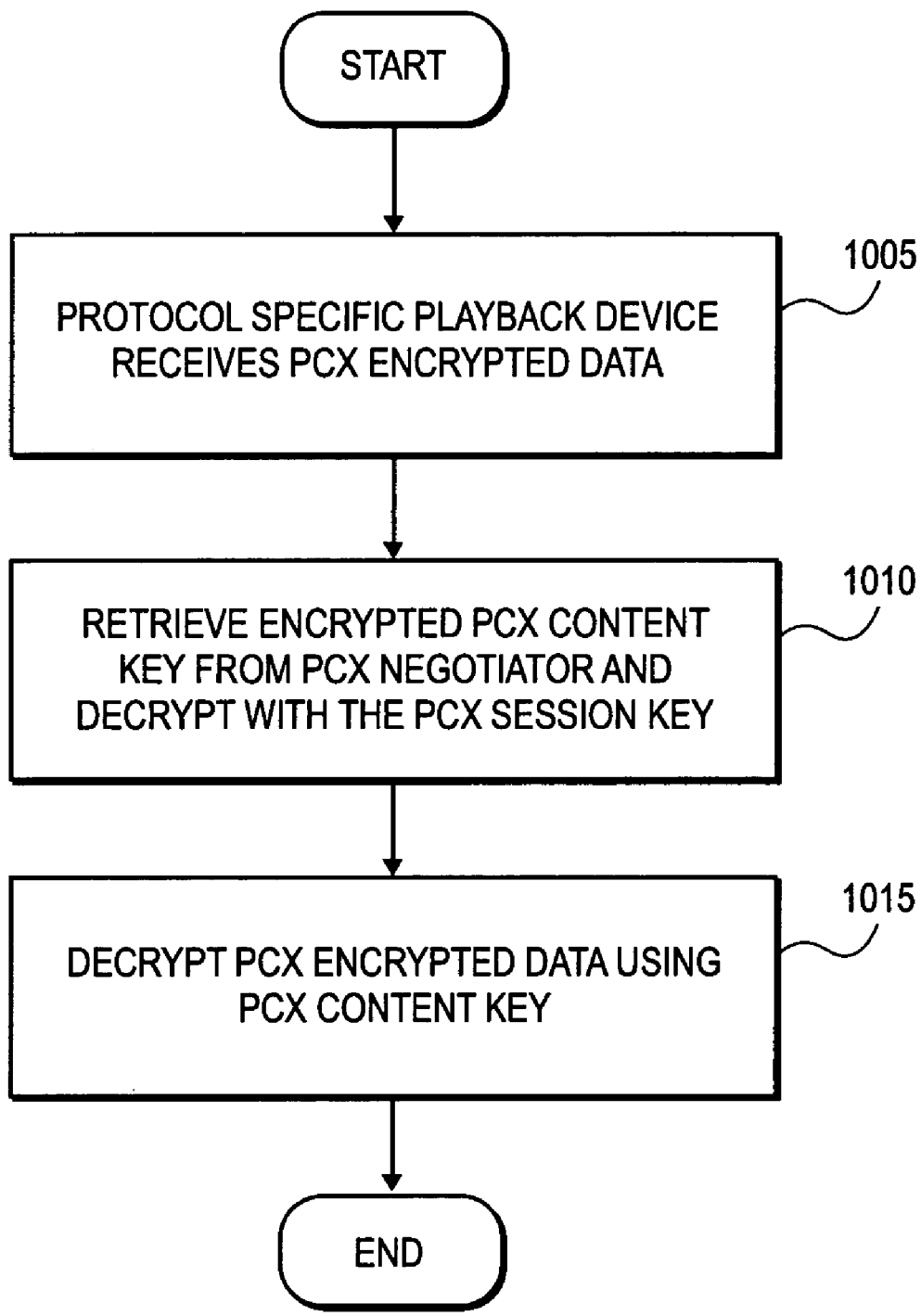
FIG. 10 is a flow diagram of one embodiment for decrypting PCX encrypted data by a decoding device.

FIG. 10 is a flow diagram of one embodiment for decrypting re-encrypted data by decoding device 102. Referring to FIG. 10, decoding device 102 receives re-encrypted data at processing block 1005. At processing block 1010, decoding device 102 retrieves the encrypted PCX content key from PCX negotiator 328. If decoding device 102 is not registered, PCX negotiator 328 registers the protocol device 102 and negotiates the PCX session key for the protocol device 102. At processing block 1015, decoding device 102 decrypts the re-encrypted data using the PCX content key.

Figure 11:
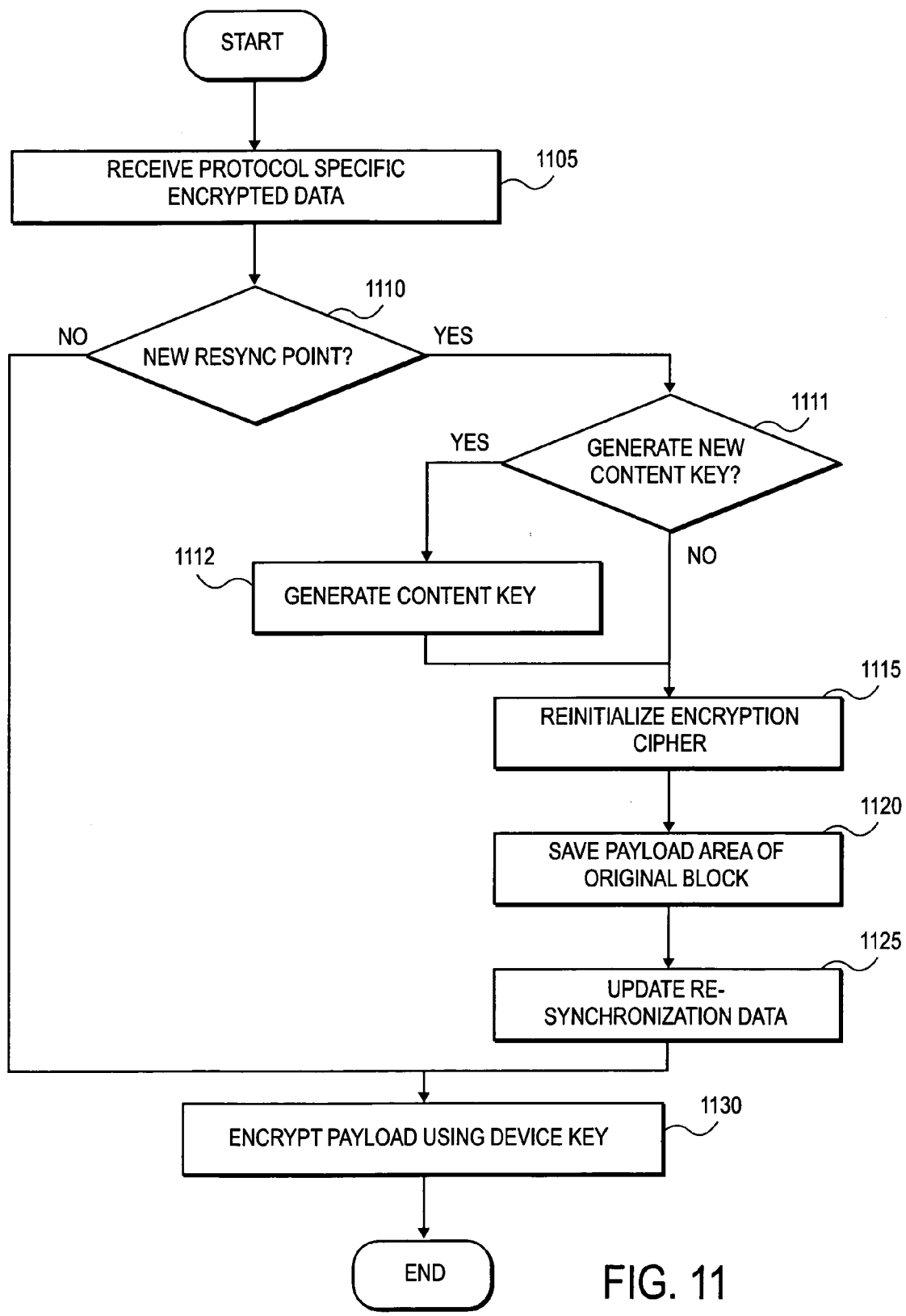
FIG. 11 is a flow diagram of one embodiment for creating a PCX resync block.

FIG. 11 is a flow diagram of one embodiment for creating a PCX resync block 720. Initially at processing block 1105, PCX module 106 receives protocol specific encrypted data. Next, at processing block 1110, PCX module 106 determines if a new resync point has been reached. If a new resync point has not been reached, processing continues at processing block 1130. If a new resync block has been reached, processing continues at block 1111. At processing block 1111, PCX module 106 determines if PCX content key needs to be generated. If no new PCX content key needs to be generated, processing continues at processing block 1115. However, if a new PCX content key needs to be generated, processing continues at processing block 1112.

At processing block 1112, the new PCX content key is generated. PCX module 106 uses the existence of natural synchronization points within the original data stream to determine when to create a new PCX content key.

At processing block 1115, PCX module 106 generates PCX tag 610 that is a unique identification for the PCX resync block 720. In one embodiment, PCX tag 610 may be an array index value. In alternate embodiments, PCX tag 610 may be any suitable index value to the PCX resync block 720. At processing block 1120, PCX module 106 copies PCX flag 609, PCX tag 610, TSID 612, and PID 614 into the payload portion of the data stream and saves the original portion in location 820 in the resync block 720.

At processing block 1125, PCX module 106 updates PCX resync data 720. If the PCX content key being used to encrypt the payload is different from the PCX content key used on the previous block for the same decoding device 102, key delta tag 810 is incremented. Otherwise, key delta tag 810 is unchanged. In this manner, PCX content keys may be changed periodically during re-encryption of the data. This increases the security of the data within system 100. In one embodiment, PCX content key is changed on a fixed time interval or after a fixed number of PES headers 608 have been processed.

In order to increase the security of system 100, the PCX content key is altered on each PES header 608 change by using a random initialization vector as a seed value to modify the key. This allows splitter 232 to drop a data block without losing the ability to decrypt the remaining data in the input stream. In one embodiment, key delta tag 810 and random initialization vector 815 are not encrypted. PCX content key 714 is encrypted with the previously negotiated PCX session key.

At processing block 1130, PCX module 106 encrypts the payload containing the resync data using the PCX content key.

Figure 12:
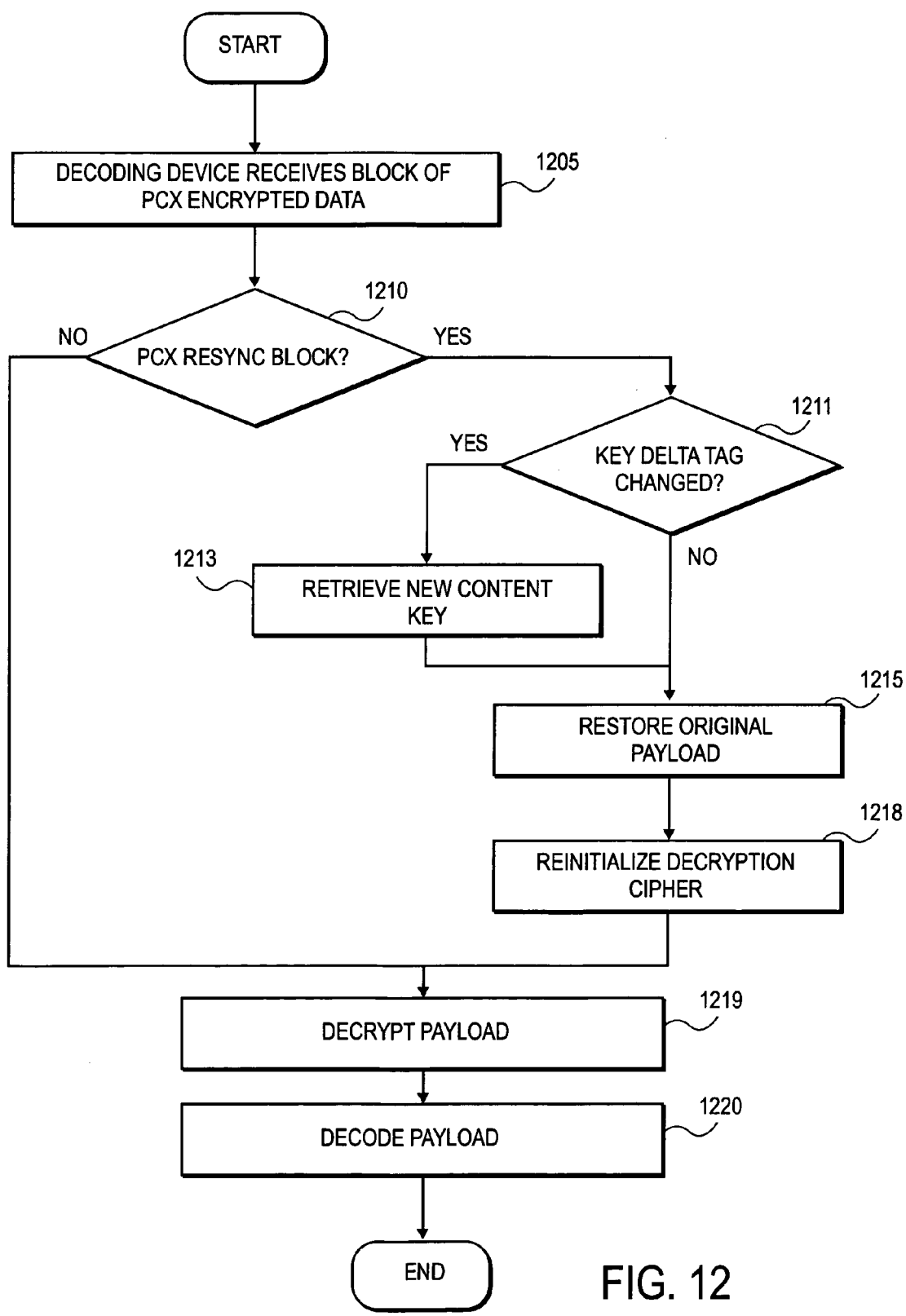
FIG. 12 is a flow diagram of one embodiment for decrypting a PCX resync block.

FIG. 12 is a flow diagram of one embodiment for decrypting a PCX resync block 720. Initially at processing block 1205, decoding device 102 receives a block of PCX encrypted data. At processing block 1210, decoding device 102 decrypts the payload and determines if the block of data is a resync block. If not, processing continues at step 1219. If the block of data is a resync block, processing continues at block 1211.

At processing block 1211, decoder 102 checks if key delta tag 810 changed. Delta tag 810 indicates if PCX content key has changed. If so, at processing block 1213, decoding device 102 retrieves PCX content key 714 from shared buffer 700. At processing block 1215, decoding device 102 extracts PCX tag 610 and performs a look-up of the resync block 720 within shared buffer 700. Decoding device 102 restores the original payload.

Decoding device 102 then decrypts the PCX content key using the previously negotiated PCX session key. At processing block 1218, decoder 102 reinitializes the decryption cipher using the PCX content key and the random initialization vector 815.

At processing block 1219, decoder 102 decrypts the payload using the decryption cipher. At processing block 1220, the decoding device 102 decodes the payload of the unencrypted data for further processing (for example, playback by MPEG decoder).

The protocol specific data may contain copy control information (CCI) which allows the content owners to assign varying levels of priority for what can and can't be done with the data. The data may be "copy free" which means there is no restriction to copying the data. The other end of the spectrum is "copy never" which means that as soon as the AKE is negotiated, a device must render the data immediately. In this scheme, a device can not make any copies, can not save the data for later use, or anything similar. Thus, when a device receives the data, it is sent to the consumer, and then the data gets thrown away.

The other two schemes are "copy once" and "copy no more." If a device receives data that is marked as "copy once," the device may make a single copy of the data if the user chooses to do so. This scheme allows recording for later viewing. When a device receives data that is marked "copy once," the device may save it, but then once it is saved, when it is retrieved after saving, the device must mark the data as "copy no more."

In one embodiment, during transfer of data within system 100, if the data is unencrypted, the CCI information is susceptible to interception and unauthorized change. Thus, if the data is marked "copy never" and the information is hacked, the data may be pirated within system 100. The CCI information is contained within transmission header 602. The transmission header 602 is not encrypted during transfer though system 100 and is susceptible to change.

Within system 100, the CCI information is built into the PCX content key. The CCI information retrieved from the data stream in transmission header 602 is used as part of the seed to generate the key. Thus, by combining the PCX content key with the control information before re-encryption, system 100 guarantees that any modification of the CCI information in the transmission header 602 will result in incorrect decryption of the protected data. During decryption of the re-encrypted data by decoding device 102, the CCI information is extracted from the transmission header 602 and combined with the PCX content key to create the decryption key.

The above method may be used to protect any information embedded within the transmission header 602. Thus, information such as, for example, copy quality which may indicate the quality of audio a user is allowed to copy, how many times a device is allowed to copy this content, and similar information may be protected from change while the data is transferred within system 100.

Figure 13:
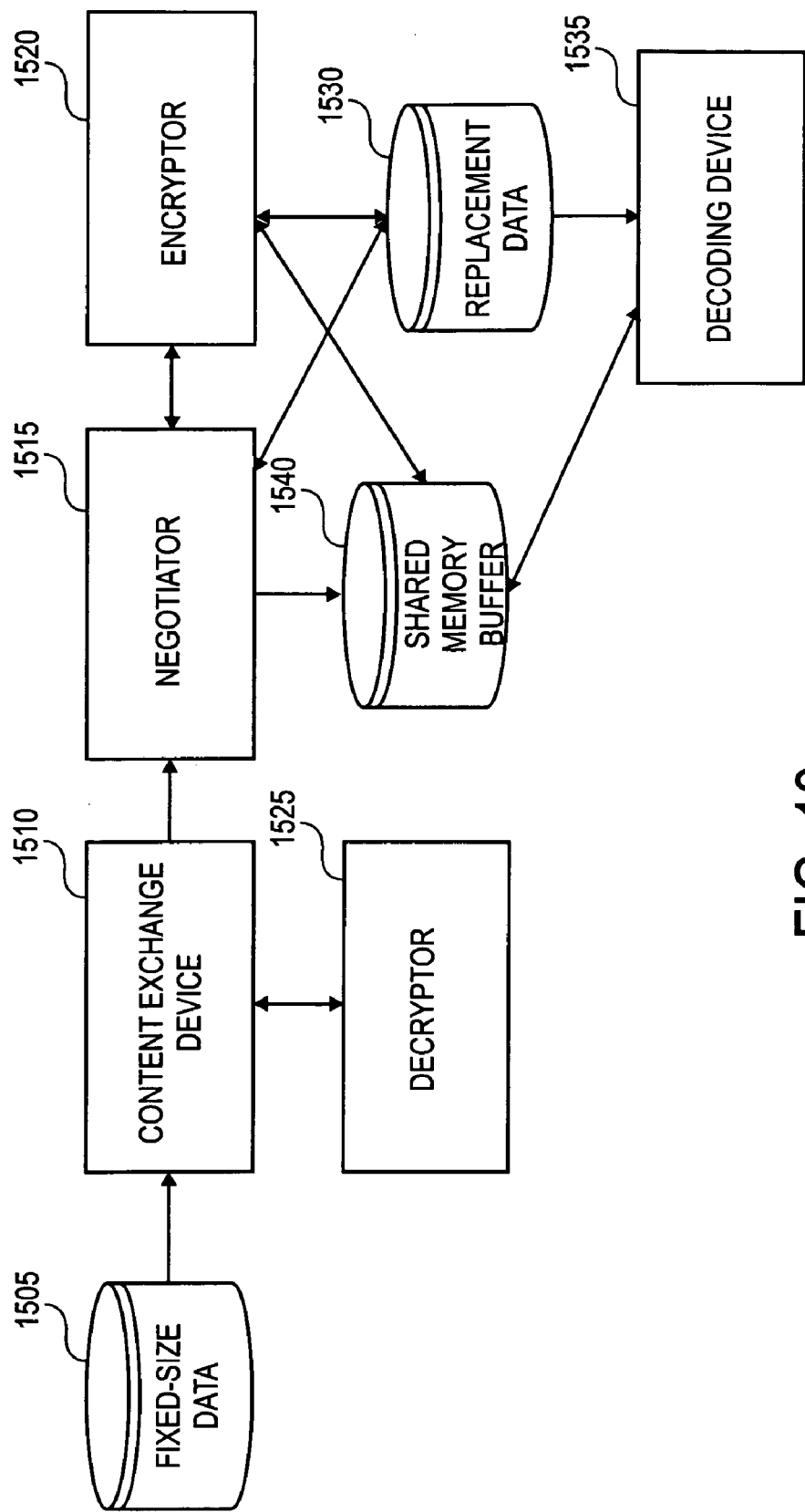
FIG. 13 is one embodiment for an information synchronizing system block diagram.

FIG. 13 is a block diagram of one embodiment for an information synchronizing system 1500. Content exchange device 1510 is configured to receive fixed-size data 1505. Content exchange device 1510 is further configured to save a portion of the original payload of the fixed-size data 1505 in shared memory buffer 1540 and configured to save synchronization information together with the original portion in shared memory buffer 1540. In one embodiment, decryptor 1525 is configured to decrypt fixed-length data 1505 as it is received by content exchange device 1510. Negotiator 1515 is configured to embed a tag to the appropriate synch block in shared memory buffer 1540 within a payload area of the fixed-size data 1505 to produce replacement data 1530. In one embodiment, encryptor 1520 is configured to encrypt the payload of replacement data 1530 and configured to encrypt the original payload saved in shared memory buffer 1540.

Decoding device 1535 is configured to extract the embedded tag from replacement data 1530 and to retrieve the original payload and synchronization information from shared memory buffer 1540 corresponding to replacement data 1530.

In one embodiment, decoding device 1535 is contained within the same device as shared memory buffer 1540. In an alternate embodiment, decoding device 1535 is a separate device from the device containing shared memory buffer 1540.

While certain exemplary embodiments have been described and shown in the accompanying drawings, it is to be understood that these embodiments are merely illustrative of and not restrictive of the broad invention. The present invention is not limited top the specific constructions and arrangements shown and described, and alternative embodiments will become apparent to those skilled in the art to which the present invention pertains without departing from the scope of the present invention. The scope of the present invention is defined by the appended claims rather than the forgoing description. In the appended claims, a physical embodiment of each recited circuit limitation does not necessarily include completely separate physical devices from another recited circuit limitation. An embodiment of each circuit may share at least one element with another circuit.

What is claimed is:

1. A machine readable medium that provides instructions, which when executed by at least one processor, cause said processor to perform operations comprising:

decrypting a payload of a data block received in a data stream from a protocol-specific device;

encrypting the payload of a data block of the data-stream with at least one key, before transmitting the data-stream from a first system to a second system, wherein the first system comprises a protected content exchange (PCX) module, and wherein the second system comprises at least one application decoder module;

replacing a portion of said payload with a tag that identifies an at least one decrypting key to said first system, before said transmitting; and setting a flag in a header of the data block that indicates that said payload has said tag, before said transmitting, wherein said processor comprises a protected content exchange (PCX) module configured to process various data stream protocols routed to one or more application decoder modules based on a protocol corresponding to the data block.

2. The medium defined in claim 1 wherein said encrypting includes encrypting said portion of said payload.

3. The medium defined in claim 1 wherein said tag includes one of:
  a data-stream identifier having sufficient information to access said at least one key, and
  a data-stream identifier having insufficient information to access said at least one key, and a source stream identifier, said source stream identifier comprising a source of said keys, and when more than one source is available to provide said portion of said payload, a source of said portion of said payload.

4. The medium defined in claim 1 wherein said operations further include
  receiving a transmission from said second system that includes data indicating said tag; and
  sending said keys and said portion of said payload to said second system based on said transmission.

5. The medium defined in claim 1 wherein said operations further include before setting said flag and encrypting said payload; said first system
  receiving a stream of data from a third system wherein said data-stream is based on said stream of data, and wherein said third system is a source device.

6. The medium defined in claim 1 wherein said encrypting includes encrypting said entire payload, including one of the at least one decrypting keys.

7. A machine readable medium that provides instructions, which when executed by at least one processor, cause said processor to perform operations comprising:
  after a fixed-length data block of a data-stream, the data block having both a payload including an encrypted data portion and at least one tag bits, and a header, is received by a second system, reading a flag in the header indicating that the data block has the tag bits, wherein a segment of the payload is removed by a transmitting first system when necessary to accommodate the at least one tag bit before the data block is received by the second system, wherein the encrypted data portion comprises at least one data portion comprising an encrypted data block of a first decrypted data block, the first decrypted data block being a data block decrypted by the first system before transmission from the first system to the second system;
  if the flag indicates that the data block has the tag bits, reading at least one bit identifying the data-stream in the tag bits;
  sending a datum from the second system to the transmitting first system indicating an identification of the read data-stream based on the at least one bit;
  the second system receiving from the first system a definition of a decrypting keys for the data-stream based on the datum sent from the second system to the first system, wherein the first system comprises a protected content exchange (PCX) module configured to process various data stream protocols routed to one or more application decoder modules of the second system, based on a protocol corresponding to the data block; and
  decrypting the data block in the second system based on the decrypting keys received by the second system.

8. The medium defined in claim 7 further including the second system receiving from the first system the removed segment of the payload based on the datum sent from the second system to the first system.

9. The medium defined in claim 8 further including the second system replacing the at least one tag bits in the payload with the removed segment of the payload, and if the removed segment of the payload is encrypted then decrypting includes decrypting the removed segment of the payload.

10. A method comprising:
  a sending system receiving a protocol specific encrypted data block from at least one protocol specific input device;
  decrypting the protocol specific encrypted data block by a protocol specific exchange module;
  the sending system replacing a portion of a decrypted data block payload of the decrypted data block with at least one tag bits that identify an at least one decrypting key;
  said sending system setting a flag in a header of said data block that indicates at least one of said payload is encrypted and said payload includes said tag;
  said sending system re-encrypting said payload with at least one key; and
  said sending system transmitting said data block to a receiving system after said setting a flag, said encrypting, and said replacing,
  wherein the sending system comprises a protected content exchange (PCX) module configured to process various data stream protocols routed to one or more application decoder modules based on a protocol corresponding to the data block, and wherein the receiving system comprises at least one application decoder module.

11. The method defined in claim 10 wherein said encrypting includes encrypting said payload portion.

12. The method defined in claim 10 wherein said transmitting occurs via a shared memory unit.

13. The method defined in claim 10 wherein
  said sending system and said receiving system are separate physical devices;
  said transmitting of said data block occurs on a first channel; and
  transmitting of non-data block data including at least one of said key from said sending system to said receiving system, said payload portion from said sending system to said receiving system, and a datum that identifies a data-stream that includes said data block, occurs on at least one separate second channel.

14. The method defined in claim 10 wherein said tag bits further identify a source of said keys in said sending system.

15. The method defined in claim 10 further including said sending system transferring a first data characterized by:
  said at least one key to said receiving system; and
  said replaced payload portion to said receiving system.

16. The method defined in claim 15 wherein said sending system transmitting said first data is based upon said receiving system transmitting to said sending system said tag bits.

17. The method defined in claim 16 further including one of:
  (a) said sending system transmitting said replaced payload portion to said receiving system based upon said receiving system transmitting to said sending system said tag bits; and said receiving system replacing said tag bits with said replaced payload portion in response to receiving said replaced payload portion from said sending system, and wherein said encrypting includes encrypting said replaced payload portion, and said decrypting includes decrypting said replaced payload portion; and
  (b) said sending system transmitting said replaced payload portion to said receiving system based upon said receiving system transmitting to said sending system a first datum that identifies a data-stream that includes said data block, and said receiving system replacing said payload portion in response to receiving said replaced payload portion from said sending system.

18. A method comprising:
a receiving system of an encrypted data block that has a payload and a header reading a set flag in a header of said data block;
said receiving system reading at least one tag bit in a payload portion of said data block in response to said reading said set flag;
said receiving system sending a first datum to a sending system of said encrypted data block that identifies a data-stream that includes said data block based on said read tag bits; and
said receiving system decrypting a payload data of said payload portion in response to receiving a decryption keys from said sending system,
wherein the sending system comprises a protected content exchange (PCX) module configured to process various data stream protocols routed to one or more application decoder modules based on a protocol corresponding to the data block, the sending system to decrypt an initial data block and to encrypt at least a portion of the decrypted initial data block prior to sending the encrypted data block that has a payload and header to the receiving system, and wherein the receiving system comprises at least one application decoder module.

19. The method defined in claim 18 wherein said tag bits have a source identifier in said sending system of said decryption keys, and further including said receiving system sending said source identifier to said sending system in response to said reading.

20. A data safeguarding system for a data block sent from a first system to a second system including:
a first system payload replacement circuit that replaces a portion of a payload of said data block with a tag data that indicates at least one decryption key for said data block in said first system, wherein the first system payload replacement circuit decrypts said payload prior to replacement of the portion of the payload;
a first system header flag setting circuit that sets a flag in a header of said data block when said data block includes said tag;
a first system encryption circuit that encrypts said decrypted payload using said at least one decryption key; and
a first system data-stream sending circuit that sends a data-stream that includes said data block to said second system after said header flag setting circuit sets said flag and said encryption circuit encrypts said payload and said payload replacement circuit replaces said portion of a payload, wherein the first system comprises a protected content exchange (PCX) module configured to process various data stream protocols routed to one or more application decoder modules based on a protocol corresponding to the data block, and wherein the second system comprises at least one application decoder module.

21. The system defined in claim 20 wherein said first system encryption circuit encrypts said portion of said payload.

22. The system defined in claim 20 wherein at least one of:
said sending occurs via a shared memory; and
said first system and said second system are separate physical devices; said sending of said data-stream occurs on a first channel; and sending non-data-stream data including at least one of said at least one key, said portion of said payload, and said data-stream identifier occurs on a second channel.

23. The system defined in claim 20 further including before said first circuit header flag setting circuit setting said flag and said first circuit encryption circuit encrypting said payload, a second circuit receiving circuit that can receive a stream of data from a third system wherein said data-stream is based on said stream of data, wherein said third system comprises a source device, and wherein a first data block of the received data stream is to be sent to a different one of the at least one application decoder module than a second data block of the received data stream.

24. The system defined in claim 20 further including
a first system sending circuit that sends said at least one key to said second system,
wherein the first system sending circuit sends said portion of said payload to said second system.

25. The system defined in claim 24 wherein said first system sending circuit sending is based upon said first system receiving from said second system a first datum that indicates at least one decryption key for said data block in said first system.

26. The system defined in claim 20, further including:
a second system header flag reading circuit that reads said flag in said header;
a second system tag data reading circuit that reads said tag data if said second system header flag reading circuit indicates that said flag includes said tag data;
a second system data sending circuit that sends to said first system a datum that identifies said data-stream based on said tag data; and
a second system decrypting circuit that decrypts said encrypted payload.

27. The system defined in claim 26 further including a first system key sending circuit that sends said at least one key to said second system, and wherein said second system decrypting circuit decrypts said data stream based on said at least one key.

28. The system defined in claim 26 further including
a first system sending circuit that sends said replaced portion of said payload to said second system in response to receiving from said second system a datum that indicates said decryption keys in said first system
said first circuit encryption circuit further encrypts said replaced portion of said payload;
a second system payload replacement circuit that replaces said received tag data with said replaced portion of said payload; and
said second system decrypting circuit further decrypts said replaced portion of said payload.

29. The system defined in claim 26 wherein said tag data further has an identifier for accessing a first system unit that can send to said second system said keys.

30. A system for safeguarding a data block of a data-stream sent from a first system to a second system comprising:
a second system header flag reading circuit that reads a flag in a header of said data block;
a second system tag data reading circuit that reads a data-stream identifier in a tag data of a payload portion of said block if said header flag reading circuit indicates that said flag includes said tag data; and
a second system data sending circuit that sends to said first system a first datum that identifies said data-stream based on said data-stream identifier, wherein the first system comprises a protected content exchange (PCX) module configured to process various data stream protocols routed to one or more application decoder modules based on a protocol corresponding to the data block, and wherein the second system comprises at least one application decoder module, the PCX module to decrypt an initial data block and to encrypt at least a portion of the decrypted initial data block prior to sending the encrypted data block that has a payload and header to the at least one application decoder module.

31. The system defined in claim 30 further including a second system decrypting circuit that decrypts said data block.

* * * * *